(12) United States Patent
Hawkins et al.

(10) Patent No.: US 7,817,063 B2
(45) Date of Patent: Oct. 19, 2010

(54) METHOD AND SYSTEM FOR REMOTELY MONITORING AND CONTROLLING FIELD DEVICES WITH A STREET LAMP ELEVATED MESH NETWORK

(75) Inventors: Stan Hawkins, Snellville, GA (US);
Charles Turner, Canton, GA (US);
Thomas Swiedler, Roswell, GA (US);
John Norseen, Kennesaw, GA (US)

(73) Assignee: ABL IP Holding LLC, Conyers, GA (US)

( * ) Notice: Subject to any disclaimer, the term of this patent is extended or adjusted under 35 U.S.C. 154(b) by 870 days.

(21) Appl. No.: 11/538,691

(22) Filed: Oct. 4, 2006

(65) Prior Publication Data

US 2007/0222581 A1 Sep. 27, 2007

Related U.S. Application Data

(60) Provisional application No. 60/723,978, filed on Oct. 5, 2005, provisional application No. 60/758,268, filed on Jan. 11, 2006.

(51) Int. Cl.
*G08B 21/00* (2006.01)

(52) U.S. Cl. ............................. 340/870.07; 340/870.16; 455/405; 455/445; 702/61

(58) Field of Classification Search ..............................
340/870.02–870.03, 870.07, 870.16; 455/405, 455/445; 702/61
See application file for complete search history.

(56) References Cited

U.S. PATENT DOCUMENTS 3,149,317 A 9/1964 Brugliera et al.
3,747,104 A 7/1973 Pansini
3,873,882 A 3/1975 Gershen
4,216,384 A * 8/1980 Hurley ......................... 307/39
4,338,562 A 7/1982 Terwilliger (Continued)

FOREIGN PATENT DOCUMENTS

CA 2419118 A1 8/2003

(Continued)

OTHER PUBLICATIONS

International Search Report for International Application No. PCT/US06/38929 dated Oct. 22, 2007.

(Continued)

*Primary Examiner*—Albert K Wong
(74) *Attorney, Agent, or Firm*—Sutherland Asbill & Brennan LLP

(57) ABSTRACT

An elevated mesh network supported and operably coupled to street lamps can be used to remotely monitor and control field devices. The packet transceiver modules of the mesh network can also be coupled to sensors that monitor operation of a street lamp as well as environmental conditions. The elevated mesh network supported by street lamps can use RF links to couple with one or more remote field devices that also have packet transceiver modules. The elevated mesh network can also include a communications gateway that couples the elevated mesh network to an asynchronous communications system. The communications gateway is a store and forward system that can periodically connect to the asynchronous communications system in order to upload compressed data derived from the remote field devices. The asynchronous communications system can connect the elevated mesh network to a back-end computer system that may monitor, diagnose, and control the remote field devices.

20 Claims, 6 Drawing Sheets

U.S. PATENT DOCUMENTS

| | | |
|---|---|---|
| 4,575,660 A | 3/1986 | Zaharchuk et al. |
| 4,691,341 A | 9/1987 | Knoble et al. |
| 4,694,223 A | 9/1987 | Campolo |
| 4,727,296 A | 2/1988 | Zaharchuk et al. |
| 4,924,151 A | 5/1990 | D'Aleo et al. |
| 4,980,806 A | 12/1990 | Taylor et al. |
| 4,988,920 A | 1/1991 | Hoeksma |
| 5,019,955 A | 5/1991 | Hoeksma |
| 5,051,727 A | 9/1991 | Fockens |
| 5,095,502 A | 3/1992 | Finzel |
| 5,187,655 A | 2/1993 | Post et al. |
| 5,191,265 A | 3/1993 | D'Aleo et al. |
| 5,209,560 A | 5/1993 | Taylor et al. |
| 5,248,919 A | 9/1993 | Hanna et al. |
| 5,329,431 A | 7/1994 | Taylor et al. |
| 5,357,170 A | 10/1994 | Luchaco et al. |
| 5,399,940 A | 3/1995 | Hanna et al. |
| 5,430,356 A | 7/1995 | Ference et al. |
| 5,452,294 A | 9/1995 | Natarajan |
| 5,463,286 A | 10/1995 | D'Aleo et al. |
| 5,473,202 A | 12/1995 | Mudge et al. |
| 5,479,159 A | 12/1995 | Kelly et al. |
| 5,487,088 A | 1/1996 | Weltz et al. |
| 5,498,931 A | 3/1996 | Bedocs |
| 5,506,715 A | 4/1996 | Zhu |
| 5,530,322 A | 6/1996 | Ference et al. |
| 5,565,855 A | 10/1996 | Knibbe |
| 5,623,256 A | 4/1997 | Marcoux |
| 5,637,964 A | 6/1997 | Hakkarainen et al. |
| 5,648,656 A | 7/1997 | Begermann et al. |
| 5,652,751 A | 7/1997 | Sharony |
| 5,654,968 A | 8/1997 | Smiroldo |
| 5,668,446 A | 9/1997 | Baker |
| 5,668,537 A | 9/1997 | Chansky et al. |
| 5,699,243 A | 12/1997 | Eckel et al. |
| 5,701,117 A | 12/1997 | Platner et al. |
| 5,721,471 A | 2/1998 | Begermann et al. |
| 5,726,644 A | 3/1998 | Jednacz et al. |
| 5,769,527 A | 6/1998 | Taylor et al. |
| 5,770,928 A | 6/1998 | Chansky et al. |
| 5,798,581 A | 8/1998 | Keagy et al. |
| 5,805,593 A | 9/1998 | Busche |
| 5,808,417 A | 9/1998 | Ference et al. |
| 5,811,785 A | 9/1998 | Heiman et al. |
| 5,811,942 A | 9/1998 | Pedretti |
| 5,812,422 A | 9/1998 | Lyons |
| 5,861,717 A | 1/1999 | Begermann et al. |
| 5,864,184 A | 1/1999 | Platner et al. |
| 5,874,903 A | 2/1999 | Shuey et al. |
| 5,884,181 A | 3/1999 | Arnold et al. |
| 5,886,423 A | 3/1999 | Gershen et al. |
| 5,898,384 A | 4/1999 | Alt et al. |
| 5,905,442 A | 5/1999 | Mosebrook et al. |
| 5,909,087 A | 6/1999 | Bryde et al. |
| 5,919,239 A | 7/1999 | Fraker et al. |
| 5,959,275 A | 9/1999 | Hughes et al. |
| 5,959,549 A | 9/1999 | Synesiou et al. |
| 5,962,989 A | 10/1999 | Baker |
| 5,962,991 A | 10/1999 | Levy |
| 5,962,992 A | 10/1999 | Huang et al. |
| 5,963,546 A | 10/1999 | Shoji |
| 5,971,597 A | 10/1999 | Baldwin et al. |
| 5,978,364 A | 11/1999 | Melnik |
| 5,986,574 A | 11/1999 | Colton |
| 5,990,635 A | 11/1999 | Ference et al. |
| 6,016,038 A | 1/2000 | Mueller et al. |
| 6,028,396 A | 2/2000 | Morrissey, Jr. et al. |
| 6,028,853 A | 2/2000 | Haartsen |
| 6,035,266 A | 3/2000 | Williams et al. |
| 6,037,721 A | 3/2000 | Lansing et al. |
| 6,044,062 A | 3/2000 | Brownrigg et al. |
| 6,046,550 A | 4/2000 | Ference et al. |
| 6,046,992 A | 4/2000 | Meier et al. |
| 6,078,251 A | 6/2000 | Landt et al. |
| 6,119,076 A | 9/2000 | Williams et al. |
| 6,124,806 A | 9/2000 | Cunningham et al. |
| 6,130,881 A | 10/2000 | Stiller et al. |
| 6,157,943 A | 12/2000 | Meyer |
| 6,160,359 A | 12/2000 | Fleischmann |
| 6,169,377 B1 | 1/2001 | Bryde et al. |
| 6,172,468 B1 | 1/2001 | Hollander |
| 6,174,073 B1 | 1/2001 | Regan et al. |
| 6,181,086 B1 | 1/2001 | Katyl et al. |
| 6,188,181 B1 | 2/2001 | Sinha et al. |
| 6,192,053 B1 | 2/2001 | Angelico et al. |
| 6,195,018 B1 | 2/2001 | Ragle et al. |
| 6,215,398 B1 | 4/2001 | Platner et al. |
| 6,239,722 B1 | 5/2001 | Colton et al. |
| 6,249,516 B1 | 6/2001 | Brownrigg et al. |
| 6,275,707 B1 | 8/2001 | Reed et al. |
| 6,285,912 B1 | 9/2001 | Ellison et al. |
| 6,300,727 B1 | 10/2001 | Bryde et al. |
| 6,301,257 B1 | 10/2001 | Johnson et al. |
| 6,304,180 B1 | 10/2001 | Platner et al. |
| 6,304,556 B1 | 10/2001 | Haas |
| 6,310,440 B1 | 10/2001 | Lansing et al. |
| 6,316,889 B1 | 11/2001 | Chansky et al. |
| 6,333,605 B1 | 12/2001 | Grouev |
| 6,340,864 B1 | 1/2002 | Wacyk |
| 6,349,091 B1 | 2/2002 | Li |
| 6,369,704 B2 | 4/2002 | Hilleary |
| 6,370,489 B1 | 4/2002 | Williams et al. |
| 6,373,399 B1 | 4/2002 | Johnson et al. |
| 6,377,001 B2 | 4/2002 | Levy |
| 6,380,696 B1 | 4/2002 | Sembhi et al. |
| 6,388,396 B1 | 5/2002 | Katyl et al. |
| 6,388,399 B1 | 5/2002 | Eckel et al. |
| 6,392,368 B1 | 5/2002 | Deller et al. |
| 6,393,381 B1 | 5/2002 | Williams et al. |
| 6,396,216 B1 | 5/2002 | Noone et al. |
| 6,415,245 B2 | 7/2002 | Williams et al. |
| 6,424,270 B1 | 7/2002 | Ali |
| 6,437,692 B1 | 8/2002 | Petite et al. |
| 6,441,565 B1 | 8/2002 | Levy |
| 6,452,339 B1 | 9/2002 | Morrissey et al. |
| 6,453,687 B2 | 9/2002 | Sharood et al. |
| 6,456,960 B1 | 9/2002 | Williams et al. |
| 6,462,654 B1 | 10/2002 | Sandelman et al. |
| 6,496,012 B1 | 12/2002 | Weng et al. |
| 6,499,114 B1 | 12/2002 | Almstead et al. |
| 6,507,158 B1 | 1/2003 | Wang |
| 6,509,828 B2 | 1/2003 | Bolavage et al. |
| 6,509,841 B1 | 1/2003 | Colton et al. |
| 6,512,455 B2 | 1/2003 | Finn et al. |
| 6,528,954 B1 | 3/2003 | Lys et al. |
| 6,535,498 B1 | 3/2003 | Larsson et al. |
| 6,545,434 B2 | 4/2003 | Sembhi et al. |
| 6,548,967 B1 | 4/2003 | Dowling et al. |
| 6,552,525 B2 | 4/2003 | Bessler |
| 6,553,020 B1 | 4/2003 | Hughes et al. |
| 6,574,227 B1 | 6/2003 | Rosenberg et al. |
| 6,581,837 B1 | 6/2003 | Hattersley |
| 6,587,046 B2 | 7/2003 | Joao |
| 6,603,276 B2 | 8/2003 | Chansky et al. |
| 6,604,062 B2 | 8/2003 | Williams et al. |
| 6,608,453 B2 | 8/2003 | Morgan et al. |
| 6,614,013 B2 | 9/2003 | Pitigoi-Aron et al. |
| 6,617,560 B2 | 9/2003 | Forke |
| 6,633,823 B2 | 10/2003 | Bartone et al. |
| 6,636,005 B2 | 10/2003 | Wacyk et al. |
| 6,640,087 B2 | 10/2003 | Reed et al. |
| 6,640,253 B2 | 10/2003 | Schaefer |
| 6,667,578 B2 | 12/2003 | Lansing et al. |
| 6,704,283 B1 | 3/2004 | Stiller et al. |

| | | |
|---|---|---|
| 6,714,895 B2 | 3/2004 | Williams et al. |
| 6,717,376 B2 | 4/2004 | Lys et al. |
| 6,717,660 B1 | 4/2004 | Bernardo |
| 6,724,159 B2 | 4/2004 | Gutta et al. |
| 6,731,079 B2 | 5/2004 | Anderson |
| 6,734,642 B1 | 5/2004 | Reverberi |
| 6,735,630 B1 | 5/2004 | Gelvin et al. |
| 6,744,740 B2 | 6/2004 | Chen |
| 6,744,766 B2 | 6/2004 | Alapuranen |
| 6,744,771 B1 | 6/2004 | Barber et al. |
| 6,751,455 B1 | 6/2004 | Acampora |
| 6,754,192 B2 | 6/2004 | Kennedy |
| 6,757,268 B1 | 6/2004 | Zendle |
| 6,771,666 B2 | 8/2004 | Barker, Jr. |
| 6,774,584 B2 | 8/2004 | Lys et al. |
| 6,777,891 B2 | 8/2004 | Lys et al. |
| 6,781,329 B2 | 8/2004 | Mueller et al. |
| 6,794,830 B2 | 9/2004 | Lansing et al. |
| 6,803,728 B2 | 10/2004 | Balasubramaniam et al. |
| 6,806,813 B1 | 10/2004 | Cheng et al. |
| 6,807,165 B2 | 10/2004 | Belcea |
| 6,807,516 B2 | 10/2004 | Williams et al. |
| 6,808,279 B2 | 10/2004 | Greiner |
| 6,836,737 B2 | 12/2004 | Petite et al. |
| 6,841,944 B2 | 1/2005 | Morrissey, Jr. |
| 6,842,668 B2 | 1/2005 | Carson et al. |
| 6,845,274 B2 | 1/2005 | Wang |
| 6,850,502 B1 | 2/2005 | Kagan et al. |
| 6,859,644 B2 | 2/2005 | Wang |
| 6,867,707 B1 | 3/2005 | Kelley et al. |
| 6,869,204 B2 | 3/2005 | Morgan et al. |
| 6,870,846 B2 | 3/2005 | Cain |
| 6,879,574 B2 | 4/2005 | Naghian et al. |
| 6,888,322 B2 | 5/2005 | Dowling et al. |
| 6,888,323 B1 | 5/2005 | Null et al. |
| 6,892,168 B2 | 5/2005 | Williams et al. |
| 6,897,624 B2 | 5/2005 | Lys et al. |
| 6,917,985 B2 | 7/2005 | Madruga et al. |
| 6,927,547 B2 | 8/2005 | Walko et al. |
| 6,930,455 B2 | 8/2005 | Chansky et al. |
| 6,933,486 B2 | 8/2005 | Pitigoi-Aron et al. |
| 6,933,685 B2 | 8/2005 | Gutta et al. |
| 6,936,978 B2 | 8/2005 | Morgan et al. |
| 6,937,985 B2 | 8/2005 | Kuma |
| 6,944,131 B2 | 9/2005 | Beshai et al. |
| 6,963,285 B2 | 11/2005 | Fischer et al. |
| 6,965,205 B2 | 11/2005 | Piepgras et al. |
| 6,965,568 B1 | 11/2005 | Larsen |
| 6,965,575 B2 | 11/2005 | Srikrishna et al. |
| 6,967,448 B2 | 11/2005 | Morgan et al. |
| 6,969,954 B2 | 11/2005 | Lys |
| 6,970,444 B2 | 11/2005 | Chwieseni et al. |
| 6,975,079 B2 | 12/2005 | Lys et al. |
| 6,977,937 B1 | 12/2005 | Weinstein et al. |
| 6,980,537 B1 | 12/2005 | Liu |
| 6,982,982 B1 | 1/2006 | Barker, Jr. et al. |
| 6,985,087 B2 * | 1/2006 | Soliman ............. 340/870.02 |
| 6,993,325 B1 | 1/2006 | Waesterlid |
| 7,012,520 B2 | 3/2006 | Webb, Sr. |
| 7,012,546 B1 | 3/2006 | Zigdon et al. |
| 7,027,808 B2 | 4/2006 | Wesby |
| 7,031,920 B2 | 4/2006 | Dowling et al. |
| 7,046,149 B1 | 5/2006 | Badenhop et al. |
| 7,050,808 B2 | 5/2006 | Janusz et al. |
| 7,064,498 B2 | 6/2006 | Dowling et al. |
| 7,071,634 B2 | 7/2006 | Johnson et al. |
| 7,075,254 B2 | 7/2006 | Chitta et al. |
| 7,084,581 B2 | 8/2006 | Honma et al. |
| 7,109,668 B2 | 9/2006 | Pogodayev et al. |
| 7,109,882 B2 * | 9/2006 | Angelis et al. ......... 340/870.02 |
| 7,113,541 B1 | 9/2006 | Lys et al. |
| 7,119,676 B1 | 10/2006 | Silverstrim et al. |
| 7,122,976 B1 | 10/2006 | Null et al. |
| 7,126,291 B2 | 10/2006 | Kruse et al. |
| 7,135,824 B2 | 11/2006 | Lys et al. |
| 7,135,956 B2 | 11/2006 | Bartone et al. |
| 7,148,800 B2 | 12/2006 | Cunningham et al. |
| 7,161,213 B2 | 1/2007 | Ito et al. |
| 7,164,110 B2 | 1/2007 | Pitigoi-Aron et al. |
| 7,166,970 B2 | 1/2007 | Johnson et al. |
| 7,167,777 B2 | 1/2007 | Budike, Jr. |
| 7,170,238 B2 | 1/2007 | Adamson et al. |
| 7,172,328 B2 | 2/2007 | Hoelen et al. |
| 7,176,807 B2 * | 2/2007 | Scoggins et al. ....... 340/870.02 |
| 7,180,251 B2 | 2/2007 | Van Eerden |
| 7,184,905 B2 | 2/2007 | Stefan |
| 7,186,003 B2 | 3/2007 | Dowling et al. |
| 7,187,141 B2 | 3/2007 | Mueller et al. |
| 7,190,124 B2 | 3/2007 | Kumar et al. |
| 7,190,125 B2 | 3/2007 | McDonough et al. |
| 7,211,968 B2 | 5/2007 | Adamson et al. |
| 7,230,972 B2 * | 6/2007 | Cornwall et al. ............. 375/134 |
| 7,231,060 B2 | 6/2007 | Dowling et al. |
| 7,242,152 B2 | 7/2007 | Dowling et al. |
| 7,248,239 B2 | 7/2007 | Dowling et al. |
| 7,253,566 B2 | 8/2007 | Lys et al. |
| 7,304,587 B2 * | 12/2007 | Boaz ..................... 340/870.02 |
| 7,308,370 B2 * | 12/2007 | Mason et al. .................. 702/65 |
| 7,321,316 B2 * | 1/2008 | Hancock et al. ........ 340/870.02 |
| 7,327,998 B2 * | 2/2008 | Kumar et al. ............... 455/405 |
| 7,333,903 B2 | 2/2008 | Walters |
| 7,400,264 B2 * | 7/2008 | Boaz ..................... 340/870.02 |
| 7,417,557 B2 * | 8/2008 | Osterloh et al. ........ 340/870.03 |
| 7,495,578 B2 * | 2/2009 | Borleske ............... 340/870.02 |
| 7,529,594 B2 | 5/2009 | Walters |
| 7,546,167 B2 | 6/2009 | Walters |
| 7,546,168 B2 | 6/2009 | Walters |
| 7,603,184 B2 | 10/2009 | Walters |
| 2001/0005368 A1 | 6/2001 | Rune |
| 2001/0034793 A1 | 10/2001 | Madruga et al. |
| 2001/0038343 A1 | 11/2001 | Meyer et al. |
| 2001/0040805 A1 | 11/2001 | Lansing et al. |
| 2002/0002444 A1 | 1/2002 | Williams et al. |
| 2002/0008621 A1 | 1/2002 | Barritz et al. |
| 2002/0009975 A1 | 1/2002 | Janusz et al. |
| 2002/0013679 A1 | 1/2002 | Petite |
| 2002/0013856 A1 | 1/2002 | Garcia-Luna-Aceves et al. |
| 2002/0016767 A1 | 2/2002 | Johnston |
| 2002/0044549 A1 | 4/2002 | Johanssen et al. |
| 2002/0060530 A1 | 5/2002 | Sembhi et al. |
| 2002/0067284 A1 | 6/2002 | Chamberlain et al. |
| 2002/0074559 A1 | 6/2002 | Dowling et al. |
| 2002/0091653 A1 | 7/2002 | Peevey |
| 2002/0101184 A1 | 8/2002 | Chinsky et al. |
| 2002/0130627 A1 | 9/2002 | Morgan et al. |
| 2002/0143482 A1 | 10/2002 | Karanam et al. |
| 2002/0152045 A1 | 10/2002 | Dowling et al. |
| 2002/0154025 A1 | 10/2002 | Ling |
| 2002/0161556 A1 | 10/2002 | Williams et al. |
| 2002/0176396 A1 | 11/2002 | Hammel et al. |
| 2002/0178047 A1 | 11/2002 | Or et al. |
| 2002/0181427 A1 | 12/2002 | Sparr et al. |
| 2002/0193969 A1 | 12/2002 | Frantz et al. |
| 2003/0020595 A1 | 1/2003 | Wacyk |
| 2003/0057884 A1 | 3/2003 | Dowling et al. |
| 2003/0061159 A1 | 3/2003 | Adams et al. |
| 2003/0076281 A1 | 4/2003 | Morgan et al. |
| 2003/0076417 A1 | 4/2003 | Thomas et al. |
| 2003/0085749 A1 | 5/2003 | Xu et al. |
| 2003/0101108 A1 | 5/2003 | Botham et al. |
| 2003/0128134 A1 | 7/2003 | Fierro et al. |
| 2003/0137968 A1 | 7/2003 | Lareau et al. |
| 2003/0198188 A1 | 10/2003 | Castlebury et al. |
| 2003/0222587 A1 | 12/2003 | Dowling, Jr. et al. |
| 2004/0001442 A1 | 1/2004 | Rayment et al. |
| 2004/0019515 A1 | 1/2004 | Senyurt |

| | | |
|---|---|---|
| 2004/0032226 A1 | 2/2004 | Lys |
| 2004/0051467 A1 | 3/2004 | Balasubramaniam et al. |
| 2004/0051485 A1 | 3/2004 | Chansky et al. |
| 2004/0052076 A1 | 3/2004 | Mueller et al. |
| 2004/0062224 A1 | 4/2004 | Brownrigg et al. |
| 2004/0068549 A1 | 4/2004 | Motoyama |
| 2004/0099736 A1 | 5/2004 | Neumark |
| 2004/0119415 A1 | 6/2004 | Lansing et al. |
| 2004/0136194 A1 | 7/2004 | Disalvo |
| 2004/0138786 A1 | 7/2004 | Blackett et al. |
| 2004/0151129 A1 | 8/2004 | Kun-Szabo et al. |
| 2004/0162902 A1 | 8/2004 | Davis |
| 2004/0177032 A1 | 9/2004 | Bradley et al. |
| 2004/0178257 A1 | 9/2004 | Jeffrey |
| 2004/0181496 A1 | 9/2004 | Odinotski et al. |
| 2004/0212993 A1 | 10/2004 | Morgan et al. |
| 2004/0232856 A1 | 11/2004 | Huber |
| 2004/0248578 A1 | 12/2004 | Korpela et al. |
| 2004/0252643 A1 | 12/2004 | Joshi |
| 2005/0029955 A1 | 2/2005 | Blake |
| 2005/0035717 A1 | 2/2005 | Adamson et al. |
| 2005/0035720 A1 | 2/2005 | Blake |
| 2005/0041161 A1 | 2/2005 | Dowling et al. |
| 2005/0047134 A1 | 3/2005 | Mueller et al. |
| 2005/0054292 A1 | 3/2005 | Janusz et al. |
| 2005/0067982 A1 | 3/2005 | Pilz |
| 2005/0075104 A1 | 4/2005 | Jaine et al. |
| 2005/0076034 A1 | 4/2005 | Addonisio et al. |
| 2005/0094493 A1 | 5/2005 | Walko, Jr. |
| 2005/0102040 A1 | 5/2005 | Kruse et al. |
| 2005/0124346 A1 | 6/2005 | Corbett et al. |
| 2005/0128666 A1 | 6/2005 | Pogodayev et al. |
| 2005/0136834 A1 | 6/2005 | Bonta et al. |
| 2005/0145688 A1 | 7/2005 | Milenkovic et al. |
| 2005/0146284 A1 | 7/2005 | Honma et al. |
| 2005/0146288 A1 | 7/2005 | Johnson et al. |
| 2005/0149345 A1 | 7/2005 | Daily |
| 2005/0161511 A1 | 7/2005 | Parker et al. |
| 2005/0163101 A1 | 7/2005 | Ashwood Smith et al. |
| 2005/0163144 A1 | 7/2005 | Srikrishna et al. |
| 2005/0164630 A1 | 7/2005 | Kates |
| 2005/0184671 A1 | 8/2005 | Williams et al. |
| 2005/0207159 A1 | 9/2005 | Maxik |
| 2005/0213350 A1 | 9/2005 | Tsuda et al. |
| 2005/0225441 A1 | 10/2005 | Keman |
| 2005/0232289 A1 | 10/2005 | Walko, Jr. et al. |
| 2005/0236998 A1 | 10/2005 | Mueller et al. |
| 2005/0242181 A1 | 11/2005 | Cunningham et al. |
| 2005/0248300 A1 | 11/2005 | Walko, Jr. et al. |
| 2005/0249215 A1 | 11/2005 | Kelsey et al. |
| 2005/0259647 A1 | 11/2005 | Wakumoto et al. |
| 2005/0271006 A1 | 12/2005 | Chari et al. |
| 2005/0275532 A1 | 12/2005 | Ferri et al. |
| 2005/0276233 A1 | 12/2005 | Shepard et al. |
| 2005/0277443 A1 | 12/2005 | Ozluturk |
| 2005/0280555 A1 | 12/2005 | Warner, IV |
| 2005/0282494 A1 | 12/2005 | Kossi et al. |
| 2005/0286426 A1 | 12/2005 | Padhye et al. |
| 2006/0002368 A1 | 1/2006 | Budampati et al. |
| 2006/0020498 A1 | 1/2006 | Aitipamula et al. |
| 2006/0038672 A1 | 2/2006 | Schoettle |
| 2006/0044152 A1 | 3/2006 | Wang |
| 2006/0049935 A1 | 3/2006 | Giannopoulos et al. |
| 2006/0058925 A1 | 3/2006 | Diederiks et al. |
| 2006/0071605 A1 | 4/2006 | Diederuks |
| 2006/0108950 A1 | 5/2006 | Chansky et al. |
| 2006/0125426 A1 | 6/2006 | Veskovic et al. |
| 2006/0144920 A1 | 7/2006 | Fang et al. |
| 2006/0202851 A1 | 9/2006 | Cash et al. |
| 2006/0235611 A1 | 10/2006 | Deaton et al. |
| 2006/0242200 A1 | 10/2006 | Horowitz et al. |
| 2006/0244395 A1 | 11/2006 | Taipale et al. |
| 2006/0244631 A1 | 11/2006 | Zigdon et al. |

| | | | |
|---|---|---|---|
| 2006/0273970 A1 | 12/2006 | Mosebrook et al. | |
| 2006/0279236 A1 | 12/2006 | Johnson et al. | |
| 2006/0284734 A1 | 12/2006 | Newman, Jr. | |
| 2007/0013489 A1 | 1/2007 | Bechtle et al. | |
| 2007/0018783 A1 | 1/2007 | Erhardt | |
| 2007/0029949 A1 | 2/2007 | Null et al. | |
| 2007/0043540 A1 | 2/2007 | Cleland et al. | |
| 2007/0046489 A1 | 3/2007 | Fair et al. | |
| 2007/0049242 A1 | 3/2007 | Fair et al. | |
| 2007/0057807 A1 | 3/2007 | Walters et al. | |
| 2007/0061020 A1 | 3/2007 | Bovee et al. | |
| 2007/0063866 A1 | 3/2007 | Webb | |
| 2007/0085699 A1 | 4/2007 | Walters et al. | |
| 2007/0085701 A1 | 4/2007 | Walters et al. | |
| 2007/0085702 A1 | 4/2007 | Walters et al. | |
| 2007/0086912 A1 | 4/2007 | Dowling et al. | |
| 2007/0091623 A1 | 4/2007 | Walters et al. | |
| 2007/0103324 A1 | 5/2007 | Kosuge et al. | |
| 2007/0109142 A1 | 5/2007 | McCollough, Jr. | |
| 2007/0121323 A1 | 5/2007 | Pawlik et al. | |
| 2007/0124074 A1 | 5/2007 | Katoh et al. | |
| 2007/0124077 A1 | 5/2007 | Hedlund, Jr. | |
| 2007/0126368 A1 | 6/2007 | McDonough et al. | |
| 2007/0146126 A1 | 6/2007 | Wang | |
| 2007/0194722 A1 | 8/2007 | Bruekers et al. | |
| 2007/0195526 A1 | 8/2007 | Dowling et al. | |
| 2007/0222581 A1 * | 9/2007 | Hawkins et al. | 340/539.1 |
| 2007/0230159 A1 | 10/2007 | Cortenraad et al. | |

FOREIGN PATENT DOCUMENTS

| | | |
|---|---|---|
| CN | 1596053 A | 3/2005 |
| CN | 1571618 A | 1/2006 |
| EP | 0586322 A1 | 3/1994 |
| EP | 0880308 A2 | 11/1998 |
| EP | 1239704 AI | 9/2002 |
| EP | 1241924 A2 | 9/2002 |
| EP | 1339155 A2 | 8/2003 |
| EP | 0880308 B1 | 9/2003 |
| EP | 1742321 AI | 1/2007 |
| ES | 2116211 AI | 7/1998 |
| FR | 2710205 AI | 3/1995 |
| FR | 2601485 AI | 1/1998 |
| FR | 2815744 AI | 4/2002 |
| GB | 2368905 A | 5/2002 |
| GB | 2372160 A | 8/2002 |
| GB | 2403357 A | 12/2004 |
| JP | 11283760 A | 10/1999 |
| KR | 1020050003165 | 1/2005 |
| WO | 9620369 AI | 7/1996 |
| WO | 0076034 AI | 12/2000 |
| WO | 0211098 A2 | 2/2002 |
| WO | 03034570 A2 | 4/2003 |

OTHER PUBLICATIONS

BelAir200: Wireless Multi-service Switch Router For Hot Zone and Metro Wi-Fi Applications, BelAir Networks Brochure, 4 pages, Downloaded Nov. 2005.

Ezendam, G.J.M. Nedap News Release: Net profits increase to 6.3 million during the first six months of 2007, from http://www.nedap/com/en/news.php?id=58, 5 pages, 2006.

Garris, L.B., "DALI Explained: Deciphering the DALI Hype," from http://www.buildings.com/functions/print_article.aspx?contentID=1463, 5 pages, Aug. 2003.

UtiliNet Series 3000 WanGate Radios: Spread Spectrum Mesh Radios, Cellnet, 2 pages, Downloaded Nov. 2005.

Pickberry Vineyard: Accenture Prototype Helps Improve Crop Management, from www.accenture.com, 2 pages, Copyright 1996-2005.

Products, from www.telemics.com/products_valueproposition.php, 1 page, printed Nov. 21, 2005.

Solution Brief: Wireless Mesh Network, Nortel Networks Brochure, 6 pages, Copyright 2005.

StreetSmarts™: Remote monitoring and control of street lights, GE Lighting Systems Brochure, 8 pages, Copyright 2003.
Technology, from www.telemics.com/technology.php, 1 page, printed Nov. 21, 2005.

Verics™ AccessPoint Data Sheet, Telemics, 1 page, Apr. 2004.
Verics™ CheckPoint Data Sheet, Telemics, 1 page, Apr. 2004.

* cited by examiner

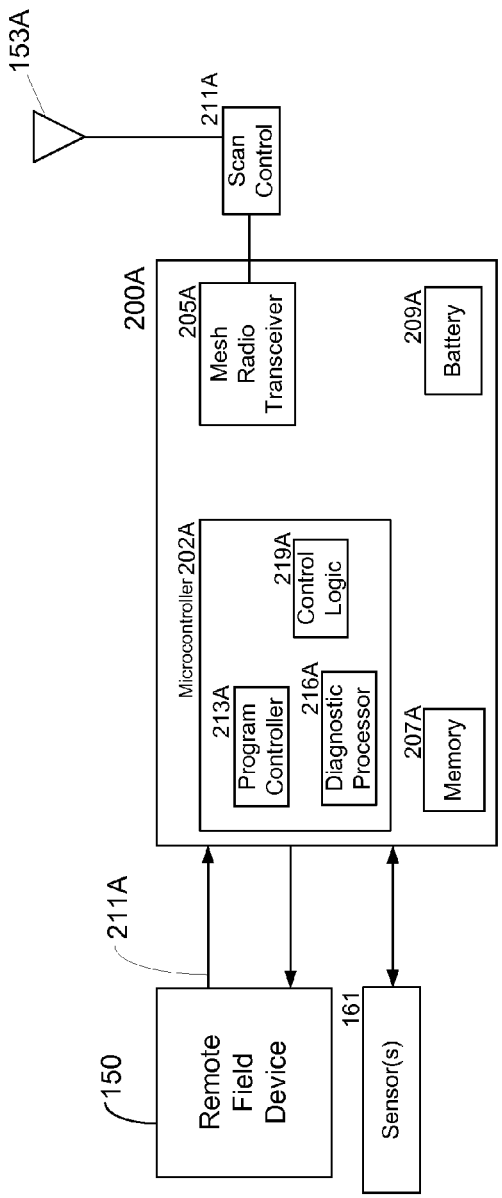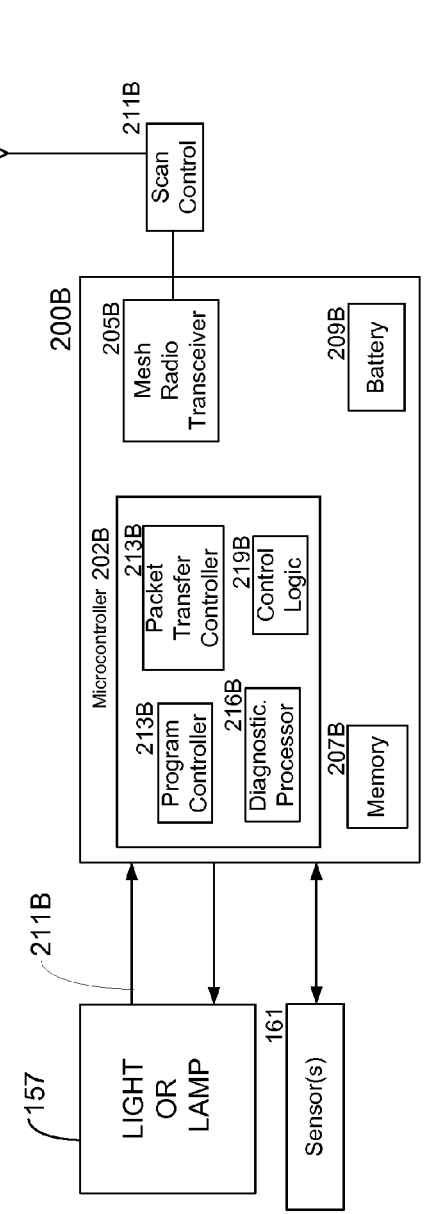

METHOD AND SYSTEM FOR REMOTELY MONITORING AND CONTROLLING FIELD DEVICES WITH A STREET LAMP ELEVATED MESH NETWORK

CROSS REFERENCE/PRIORITY CLAIM TO RELATED PATENT APPLICATIONS

This application claims priority under 35 U.S.C. §119(e) to U.S. Provisional Patent Application No. 60/723,978, entitled "Light Utility Monitoring System," filed on Oct. 5, 2005. This application also claims priority under 35 U.S.C. §119(e) to U.S. Provisional Patent Application No. 60/758,268, entitled "Light Utility Monitoring System with Middleware System," filed on Jan. 11, 2006. The contents of both provisional patent applications are hereby incorporated by reference.

TECHNICAL FIELD

The invention relates to an elevated mesh network on street lights or lamps that provides connectivity between wireless packet radios on field devices and back-end computer systems. More particularly, the invention relates to a system and method for establishing communications between non-light remote field devices operating in proximity to the elevated mesh network and back-end computer systems through establishing wireless links between the elevated mesh network and non-light field devices.

BACKGROUND OF THE INVENTION

Many companies, municipalities, and local governments must employ a significant amount of workers to monitor and maintain equipment that may operate at distant locations relative to the operations center of a company, municipality, or local government. For example, utility companies such as electric companies must employ workers to go out and to collect data from electric meters so that an electric company can accurately measure consumption by its customers for billing purposes. Often, electric company workers go out in to the field and must physically read analog or digital meters to collect data on electricity consumption by a customer.

In other cases, utility meters, such as electric meters, can be provided with low power radios that can be interrogated with hand held or vehicle-mounted reading units. In such cases, workers with these hand held or vehicle-mounted reading units must be in close proximity relative to the low power radios in order to interrogate the low power radios and to collect that data from a meter. While the low power radios on the meters increase the speed and accuracy in which data can be collected by a worker, this conventional solution still requires a worker to position himself or herself in the field in close physical proximity to the meters, usually within the range of fifty feet to any particular meter. Often, because the low power radios are required by the Federal Communications Commission (FCC) to operate with such low power and because the meters are often obstructed by buildings and other physical objects, it is necessary for the worker to establish a line-of-sight coupling with the low power radio to interrogate and read it.

Another problem faced by utility companies, such as electric companies, is the monitoring and control of residential equipment such as air conditioners. According to some conventional programs, customers of electric companies may voluntarily relinquish control of their air conditioning unit so that the electric company can turn a particular customer's air conditioning unit on or off depending upon peak power loads monitored by the electric company. Many electric companies use existing power lines as the communications medium for controlling the operation of such air conditioning units. There are problems associated with using existing power lines as the communications medium for controlling air conditioning units. On such problem is the amount of hardware and its associated costs to support this type of communications medium that uses power lines. Also, reliability of power line carriers (PLCs) is usually low because PLCs are more susceptible to noisy, electromagnetic environments compared to other communication mediums, such as over-the-air radio frequency communications.

In addition to the problems faced by utility companies with controlling residential equipment from a distance and using workers to acquire data from meters, there are other problems associated with other types of equipment that may be remotely located relative to the organization that controls and maintains the equipment. For example, municipalities usually need to employ workers that monitor and maintain parking meters. A worker is needed to collect any money received by a meter and to verify that a parking meter is working properly. If information is collected by the parking meter, such as number of vehicles parked in space per day/hour or if a vehicle is present in proximity to the meter, then such information would also need to be collected by the human worker during his or her survey of the meters.

For other equipment, such as traffic control devices, municipalities often employ workers to perform routine checks on equipment for malfunctions and for increasing operation efficiency of the equipment. As one example, municipalities and local governments employ staff to maintain and monitor traffic lights. Usually, such staff must observe operations of traffic lights first hand in order to optimize performance and detect any malfunctions of the traffic lights. Also, staff usually must observe traffic patterns first hand in order to set the timing of the traffic lights.

As another example, municipalities and/or companies also employ staff to monitor and maintain automated barriers and gates to railroad crossings and draw bridges. Usually, automated barriers and gates do not have a way to communicate their operation and any environmental conditions, such as weather and traffic flow, back to a central location.

Accordingly, there is a need in the art for a method and system that can collect information from and provide control to remote field devices relative to a central location. There is a further need in the art for a method and system that can establish communications with a remote field device without using significant communications hardware, such as wires, cables, and/or new radio equipment.

SUMMARY OF THE INVENTION

A method and system for remotely monitoring and controlling field devices can include an elevated mesh network that comprises a plurality of packet transceiver modules that are supported and coupled to street lamps. The packet transceiver modules can also be coupled to sensors that monitor operation(s) of a street lamp as well as environmental conditions, such as ambient light and/or weather conditions relative to a street lamp. The combination of the packet transceiver modules and any sensors may be referred to as a node. A plurality of nodes can form the elevated mesh network.

In addition to monitoring and controlling operation of a street lamp, each packet transceiver module of a node may be coupled to a remote field device through a wireless link, such as through a radio frequency (RF) channel supported by the elevated mesh network. However, other wireless links and non-RF communication channels are not beyond the invention, such as, but not limited to, magnetic, optical, acoustic, and other similar wireless links. Each remote field device can receive commands from as well send operation data to the elevated mesh network through the wireless link. Each remote field device can receive its commands and transmit data by using a packet transceiver module that is attached to the remote field device and coupled to one or more packet transceiver modules of the elevated mesh network through the wireless link. The packet transceiver module of each remote field device may also be coupled to one or more sensors that provide operation data for a respective remote field device.

A remote field device can be any one of several types or classes of devices. Remote field devices can include, but are not limited to, utility meters such as gas, electric, water, oil, and other like meters and other like meters as well as any type of building monitor or gauge such as a security system; a parking meter; a traffic control device such as a stop light, moveable gate, drawbridge, and other like traffic control devices; pumps, generators, and other like machinery. A remote field device is typically a device that is positioned between the earth and the elevated mesh network. However, subterranean remote field devices or remote field devices positioned in the earth's atmosphere or in space are not beyond the invention.

The elevated mesh network can link the remote field devices to an asynchronous middleware communications system. To link the elevated mesh network to the asynchronous middleware communications system, at least one node of the elevated mesh network can include a communications gateway. The communications gateway can be coupled to the asynchronous middleware communications system through either a wired or wireless link. The communications gateway is a store and forward system that connects with the asynchronous middleware communications system on periodic basis.

The asynchronous middleware communications system can be coupled to a back-end application or computer system. The back-end application or computer system can diagnose and control the remote field devices as well as archive the data received from the remote field devices.

The communications gateway typically includes all of the hardware, software, and functionality of a regular node that is part of the elevated mesh network. That is, the communications gateway can function and behave like a regular node by being coupled to one or more other nodes by a wireless link. In addition to the hardware and software of a regular node, the communications gateway can also include a microcontroller, memory, and separate transceiver module dedicated to managing data received from and for sending commands to remote field devices.

In other words, the communications gateway may have two or more microcontrollers (CPUs), memories, and transceiver modules: one designed for normal node operations and one dedicated for establishing the link with the asynchronous middleware communications system. A first transceiver module of the communications gateway that is dedicated to establishing a link with the asynchronous communications gateway can operate on an entirely different frequency or frequency band relative to a second transceiver module that has another frequency dedicated for elevated mesh network communications. For example, according to one exemplary aspect, the first transceiver node dedicated to establishing a link with the asynchronous middleware communications system can operate on a cellular telephone frequency band while the second transceiver node dedicated to node operations can operate at a different frequency band.

The communications gateway can be designed to compress and store data that is received from remote field devices coupled to the elevated mesh network. At predetermined intervals, the communications gateway can establish a link with the asynchronous middleware communications system. According to one exemplary aspect, the communications gateway can establish the link with the asynchronous middleware communications system when it receives an information request from the asynchronous middleware communications system.

The communications gateway can also establish the link to the asynchronous middleware communications system after a predetermined amount of time. Alternatively, the communications gateway can establish the link when it receives special values in the data received from remote field devices. For example, a remote field device needing repair may send a special message that can prompt the communications gateway to establish a link with the asynchronous communications system. In other cases, remote field devices could send a change code in their data that can prompt the communications gateway to establish a link. Irrespective of the condition that causes the communications gateway to establish a link with the asynchronous middleware communications system, the communications gateway is designed to establish the link on a periodic basis in order to conserve resources and opposite to a link that would provide constant communication to the asynchronous middleware communications system. According to one exemplary aspect, by establishing a link to the asynchronous middleware communications system on a periodic basis, the communications gateway can substantially reduce operating costs and increase efficiency especially in environments in which fee-based cellular phone networks are used as the link to the asynchronous middleware communications system.

BRIEF DESCRIPTION OF THE DRAWINGS

FIG. 2 is a functional block diagram illustrating some core architectural components of a packet transceiver module that can be coupled to a remote field device according to one exemplary embodiment of the invention.

FIG. 3 is a functional block diagram illustrating some core architectural components of a packet transceiver module that forms a node of an elevated mesh network according to one exemplary embodiment of the invention.

DETAILED DESCRIPTION OF EXEMPLARY EMBODIMENTS

The inventive method and system for remotely monitoring and controlling field devices can include an elevated mesh network that has packet transceiver modules supported and operably coupled to street lamps. The packet transceiver modules can also be coupled to sensors that monitor operation of a street lamp as well as environmental conditions, such as ambient light and weather conditions relative to a street lamp. Each street lamp with a transceiver module may form a node and a plurality of nodes may form an elevated mesh network.

The elevated mesh network supported by street lamps can use RF links to couple with one or more remote field devices that also have packet transceiver modules. The elevated mesh network can also include a communications gateway that couples the elevated mesh network to an asynchronous communications system. The communications gateway is a store and forward system that can periodically connect to the asynchronous communications system in order to upload compressed data derived from the remote field devices. While connecting to the asynchronous communications system, the communications gateway can also receive data from the asynchronous communications system. The asynchronous communications system can connect the elevated mesh network to back-end computer system that may monitor, diagnose, and control the remote field devices.

Figure 1:
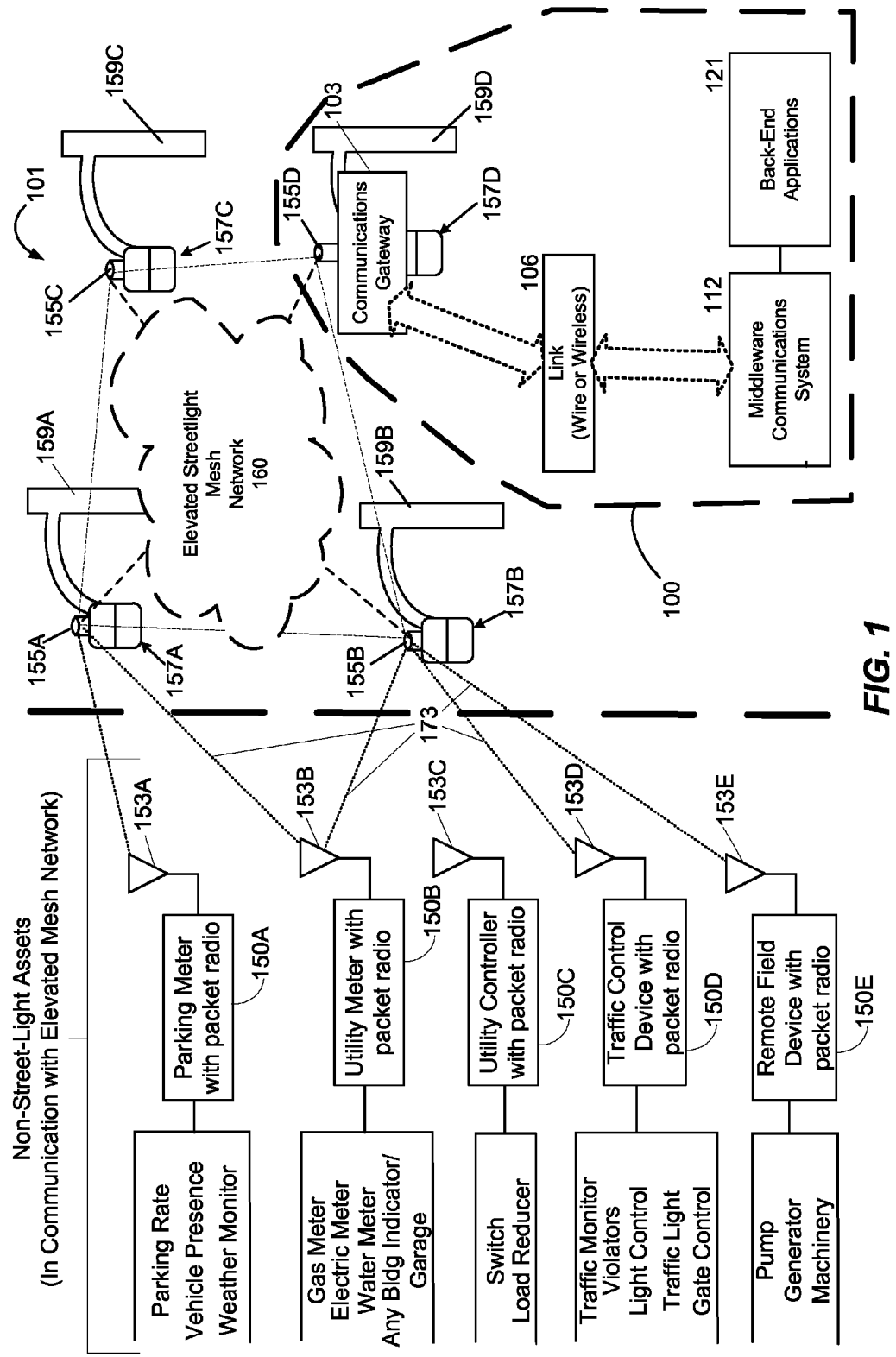
FIG. 1 is a functional block diagram of some core architectural components for an elevated mesh network that couples remote field devices operating in radio-frequency range of the elevated mesh network to an asynchronous middleware communications system according to one exemplary embodiment of the invention.

Referring now to the drawings, in which like numerals represent like elements throughout the several Figures, aspects of the invention and the illustrative operating environment will be described. FIG. 1 is a functional block diagram of some core architectural components of an elevated mesh network 160 that couples remote field devices 150 operating in radio-frequency range of the elevated mesh network 160 to an asynchronous middleware communications system 112 according to one exemplary embodiment of the invention.

As noted above, a remote field device 150 can be any one of several types or classes of devices. Remote field devices 150 can include, but are not limited to, utility meters 150B such as gas, electric, water, oil, and other like meters as well as any type of building monitor or gauge such as a security system; a parking meter 150A; a traffic control device 150D such as a stop light, moveable gate, drawbridge, and other like traffic control devices 150D; pumps, generators, and other like machinery.

A remote field device 150E is typically a device that can be positioned between the earth and the elevated mesh network 100. However, other spatial positions are not beyond the scope of the invention. For example, the remote field device 150E could be subterranean or above the elevated mesh network 100 in the earth's atmosphere. The remote field device 150E is generally in proximity to the elevated mesh network 100 such that radio frequency communications can be established between the device 150E and the elevated mesh network 100.

Each remote field device 150E may be equipped with a packet transceiver module (not illustrated in FIG. 1 but illustrated in FIG. 2). For the parking meters 150A illustrated, in addition to tracking money deposited into a meter 150A, each parking meter can be equipped with one or more sensors such as a vehicle presence sensor and an ambient weather sensor. Each gas and water meter may measure volumetric flow of product while each electric meter may measure power consumption in kilowatt hours or fractions thereof, in gross or based on time of day, or any other like power measuring units. Similar to the parking meter 150A, each utility meter 150B may include additional sensors (not illustrated in FIG. 1 but illustrated in FIG. 2) that measure external environmental conditions.

In FIG. 1, a utility meter 150B is illustrated separately from a utility controller 150C. The utility meter 150B is designed to upload data that it receives through using a packet transceiver module. One of ordinary skill in the art recognizes that these two remote field devices 150B, C may be coupled to the same remote field device 150. Further these two remote field devices 150B, C can be combined into a single device. Each utility controller 150C may include a switch, load reducer, or some other form of active control that may be monitored and activated from a remote location.

While not illustrated in detail in FIG. 1, each remote field device 150 has a packet transceiver module (not illustrated) with an antenna 153A-E. Each remote field device 150 can use its antenna 153 to couple itself over a wireless link 173, such as an RF link, to the elevated mesh network 160. While RF links 173 are the preferred form of wireless connection between each remote field device 150 and the elevated mesh network 160, one of ordinary skill in the art recognizes that other wireless connections, such as infrared, acoustic, magnetic are not beyond the scope of the invention. The RF link can be any single frequency or a band of frequencies and can be operated in accordance with standards, such as 802.XX, to include 802.15 for Personal Area Networks (PAN), such as Bluetooth.

The elevated mesh network 160 can include a one or more nodes 155 that are usually positioned on top of a street light 157. Each street light 157 is typically supported by a utility pole 159. Each node 155 can include a packet transceiver module (not illustrated in FIG. 1 but illustrated in FIG. 3) that establishes an RF communications link between a node 155 and a remote field device 150 as well as between other nodes 155 that are part of the elevated mesh network 160. Further details of the packet transceiver node are discussed below in FIG. 2. Each node 155 may be contained within a cylindrically shaped housing that is connected to the housing of a respective street light 157. However, the inventive system is not limited to the size and shape of the node housings illustrated in FIG. 1. Other sizes, color patterns, material compositions, and shapes, such as circular, rectangular, and many other simple or complex shapes are not beyond the invention.

While the elevated mesh network 160 is preferably formed by nodes 155 that are coupled to street lights or lamps 157 and that are elevated above ground, the inventive system is not limited to nodes 155 that are coupled to street lamps 157. Nodes 155 can be positioned without any connection to a street lamp 157 on any type of utility pole 159 so that they are elevated above the earth. When the nodes 155 are elevated above the earth, they can provide a natural unobstructed, line-of-sight coupling between remote field devices 150 and each node 155. The inventive system can use existing elevated mesh networks 160 that may be designed to only control the lamps 157. The existing mesh networks 160 can be modified to operate according to the inventive system. One modification includes providing at least one communications gateway 103 that is positioned in the elevated mesh network 160 similar to any other node.

The communications gateway 103 can be designed to function and operate like any other node 155. That is the communications gateway 103, like the other nodes 155, can relay receive and re-transmit information from one node 155 to another node 155. However, the communications gateway 103 may be provided with additional functionality. The communications gateway 103 can be designed to compress and store data that is received from remote field devices 150 coupled to the elevated mesh network 160. Further details of the hardware for the communications gateway 103 will be discussed below with reference to FIG. 4.

At predetermined intervals, the communications gateway 103 can establish a link 106 with the asynchronous middleware communications system. The link 106 can be wired or wireless. According to one exemplary and preferred embodiment, the link 106 with the asynchronous middleware communications system 112 is wireless and is typical a radio-frequency (RF) one. The wireless link 106 can include a frequency or frequency band that is different than the frequency or frequency band of the elevated mesh network 160. According to another exemplary and preferred embodiment, the wireless link 106 is established using a cellular telephone network.

By establishing the wireless link 106 with the asynchronous middleware communications system 112 only if certain conditions are met, this provides the inventive system with a tremendous benefit and advantage over conventional technology that may require a constant link or connection to communicate with a back-end computer system 121. In the cellular telephone non-limiting example, by establishing the link 106 to the asynchronous middleware communications system 112 only periodically and through using compressed data, the communications gateway 103 can significantly conserve resources such as bandwidth and connection time. Often communication rates over a cellular phone network are based on connection time or duration. By establishing connections infrequently and for short durations on a cellular network, the communications gateway 103 can substantially reduce operating costs and extend the mean time between failures (MTBF) for components of the inventive system. In other words, scheduling only periodic links 106 can also conserve costs that are associated with wireless networks and "airtime". The periodic links 106 can also support improved system MTBF rates for system components.

Wireless Link 106 Condition of FIG. 1: Authorized Request or Control Signal (or Both) from Asynchronous Communications System 112

According to one exemplary embodiment, the communications gateway 103 can establish the link 160 with the asynchronous middleware communications 100 system when it receives an authorized information request from the asynchronous middleware communications system 112. For example, a back-end computer system 121 such as a legacy mainframe of the asynchronous communications system 112 may want to survey the remote field devices 150 to determine the operational state of each remote field device 150 for diagnostics purposes. Such a survey may be conducted to determine which remote field device may be need in repair. However, the inventive system is not limited to this type of authorized information request made by the back-end computer system 121. Other authorized information requests can include assessing the load and/or environmental conditions of a remote field device 150 through its sensors (not illustrated in FIG. 1 but illustrated in FIG. 2).

Assessing environmental conditions of a remote field device 150 could include assessing weather conditions including temperature, precipitation, or lack of precipitation. Other environmental conditions can include, but are not limited to, ambient light conditions, assessing power use and load conditions. Load conditions that can be monitored for parking meters 150A can include number of vehicles currently paying at a meter, the presence or lack of presence of vehicles in parking spaces, and the time of year corresponding to the volume of vehicles. Load conditions for a utility meter 150B can include monitoring consumption of product and comparing these conditions to the environmental conditions and consumption of product measured by other meters in a predefined geographic locations. Load conditions for traffic control devices 150D can include measuring the volume of traffic adjacent to a traffic control device 150D.

In addition to monitoring the remote field devices 150, the back-end computer system 121 can control the remote field devices 150 in response to the load conditions present at a remote field device 150. For parking meters 150A, the back-end computer system 121 can control the prices charged for parking depending upon demand. Demand for parking can fluctuate based on weather conditions as well as based on the time of year (holiday shopping, back to school time, etc.) The back-end computer system 121 can raise or lower price at parking meters 150 depending upon demand.

Similarly, back-end computer system 121 can adjust utility product consumed by customers by activating a utility controller 150C such as a switch for cutting off power, gas, oil, or water. A utility controller 150C could also include controls for large residential utilities such as a switch or load reducer coupled to an air conditioner, heat pump, furnace, hot water heater, water irrigation system, and the like. The back-end computer system 121 can also control remote field devices 150 that are coupled to alarm systems such as fire alarms, security systems, and the like.

Wireless Link 106 Condition of FIG. 1: Predetermined Time Intervals

The communications gateway 103 can also establish the link 106 to the asynchronous middleware communications system 112 after a predetermined amount of time. The back-end computer system 121 can set this time period that is measured and monitored by the communications gateway 103. This time period can be set for any sized time period: seconds, minutes, hours, days, week, months, years, etc. The time period will often be a function of the type of field device 150 that is being monitored and controlled by the back-end computer system 121. For example, a back-end computer system 121 may set the time period in hour increments to establish the link 106 when data is taken from parking meters 150A and utility meters 150B. Meanwhile, the back-end computer system 121 may set the time period in daily increments to establish the link 106 when data has been taken from traffic control devices 150D.

Wireless Link 106 Condition of FIG. 1: Special Data or Delta Change Code Received from Remote Field Devices 150

Alternatively, the communications gateway 103 can establish the link when it receives special values in the data received from remote field devices 150. For example, a remote field device 150 needing repair may send a special message that can prompt the communications gateway 103 to establish the link 106 with the asynchronous middleware communications system 112. In other cases, remote field devices 150 could send a change code message it its data that can prompt the communications gateway 103 to establish a link 106 with the asynchronous middleware communications system 112.

Synopsis for Periodic Link 106 with Asynchronous Middleware Communications System 112 of FIG. 1

Irrespective of the condition that causes the communications gateway 103 to establish a link with the asynchronous middleware communications system 112, the communications gateway is designed to establish the link 106 on a periodic basis in order to conserve resources and opposite to a link (not shown) that would provide constant communication to the asynchronous middleware communications system 112. According to one exemplary aspect, by establishing a link 106 to the asynchronous middleware communications system 112 on a periodic basis, the communications gateway 103 can substantially reduce operating costs and increase efficiency of the inventive system especially in environments in which fee-based cellular phone networks are used as the link 106 to the asynchronous middleware communications system 112.

Asynchronous Middleware Communications System 112 of FIG. 1

The asynchronous middleware communications system 112 can be any type of communications system that provides a connection between the elevated mesh network 160 and an a back-end computer system 121. According to one preferred and exemplary embodiment, the asynchronous middleware communications system 112 can comprise the enfoTrust™ Telemetric Monitoring (ETM) that includes the RedRover™ data transport architecture, described in commonly assigned and co-pending U.S. Non-Provisional patent application Ser. No. 11/317,646, entitled, "System and Method for Communicating Data Between Wireless Gateway and a Back-End Computer System," filed on Dec. 23, 2005. The entire contents of the Ser. No. 11/317,646 patent application are hereby incorporated by reference.

The asynchronous middleware communications system 112 The term, "asynchronous," is used to describe the middleware communications system 112 system because the middleware system 112 can pre-process information that is destined for and received from a the communications gateway 103 when the communications gateway 103 is not coupled, or off-line relative to the back-end computer system 121.

The asynchronous middleware system 112 can support one or more communication, file, and data transport protocols. Such protocols can include, but are not limited to, FTP, HTTPS, TCIP, MESH, 802.11, 802.15, GSM, GPRSM, TDMA, etc.

The asynchronous middleware system 112 can anticipate and process needs for the communications gateway 103 when the gateway 103 is not "synchronized" with back-end computer system 121. The middleware system can prepare information for downloading from back-end computer system to the gateway 103 well in advance of a established communication link 106 while the gateway 103 is not "synchronized"—not coupled to the back-end computer system 121. When the communications link 106 is established, the gateway 103 is coupled to or on-line with or "synchronizing with" back-end computer system 121 such that the back-end computer system 121 can send data to and receive data from the communications gateway 103 of the elevated mesh network 160.

The asynchronous middleware communications system 112 can also simply receive information uploaded from the communications gateway 103 during a communication link 106 without adding time to the communication link 106. The asynchronous middleware communications system 112 can reduce or eliminate extra communications that are often associated with processing information when information is uploaded to the asynchronous middleware communications system from the gateway 103 of the elevated mesh network 160. In other words, the asynchronous middleware communications system 112 can keep communications between itself and the gateway 103 simple in order to promote efficient and rapid transfer of information between the middleware system 112 and gateway 103 during a periodic communication link 106. This simplicity in communications between the middleware system 112 and gateway 103 can reduce the duration of a communication link.

As one example of simple communications between the asynchronous middleware communications system 112 and the gateway 103 of the elevated mesh network 160 during a communication link 106, the middleware system 112 does not typically perform any rigorous authentication of the gateway 103. Instead, the middleware system 112 can usually authenticate the gateway 103 by comparing a gateway identifier that is unique to the gateway 103 and stored by the middleware system 112 with the identifier that is transmitted by the gateway 103. If these two identifiers match, the gateway 103 can be authenticated by the middleware system. Further details of the asynchronous middleware communications system 112 will be described below in connection with FIG. 5.

However, one of ordinary skill in the art recognizes that one or more additional layers of security could be implemented by the middleware system 112 without significantly affecting the simple communications that are established between the gateway 103 and the middleware system 112. For example, information security that contains defense in depth and is geared to best design practices, such as role based access controls (RBAC), to strengthen confidentiality, availability and integrity, in accordance with existing standards such as ISO 17799 as well as future standards not yet developed, can be implemented without significantly affecting performance of the entire system 101.

Back-End Computer System 112 of FIG. 1

The asynchronous middleware communications system 112 couples the elevated mesh network 160 to back-end computer systems 121. The back-end computer systems 121 can further comprise various application-specific software and sometimes includes legacy software and/or hardware that may run on larger computers, like server computers. For example, a back-end computer system 121 can include, but is not limited to, application software that is specific to an industry or local government such as utilities, municipalities, construction, large-scale contracting, and/or other like industries. In a utility application, as noted above, the back-end computer system 121 can monitor and control utility meters 150B and utility controllers 150C. In a municipality application, the back-end computer system 121 can monitor and control parking meters 150A and traffic control devices 150D. For example, the back-end computer system 121 can raise or lower parking meter rates depending on consumer demand as well as adjusting timing and frequency of traffic lights, traffic gates, and other like equipment. Expert systems can also be used in the system 101 from the back-end computer system 121 to embedded logic in the remote field devices 150 and the nodes 155 of the mesh network 160.

Packet Transceiver Modules 200A of FIG. 2 Coupled to Remote Field Devices 150

Referring now to FIG. 2, this figure is a functional block diagram illustrating some core architectural components of a packet transceiver module 200A that can be coupled to a remote field device 150 according to one exemplary embodiment of the invention. The packet transceiver module 200A can comprise a microcontroller 202A, a radio transceiver 205A, a memory module 207A, and a battery 209A. The packet transceiver module 200A may support packet switched communications and it may support amateur packet radio as well as General Packet Radio Service (GPRS). However, other protocols are not beyond the scope of the invention. Further, the packet transceiver module 200A may support communications that do not require protocols or specific formats. The packet transceiver module 200A can work with established X.25 to newly emerging standards, such as Frame Relay as of this writing.

The microcontroller 202A can include several other subcomponents. The microcontroller 202A can comprise a program controller 213, a diagnostics processor 216, and control logic 219. The program controller 213 can execute embedded software code that may control operations of the packet transceiver module 200A. The program controller 213 can be programmed to initiate radio communications to establish the link 173 to the elevated mesh network 160.

The diagnostic processor 216 can manage the signals received from the output lines 211A coupled to the device 150 as well as the signals received from the environmental sensors 161. The control logic 219 can manage the signals sent through the input lines 211A to the device 150 and sent to the environmental sensors 161. The control logic 219 may be responsible for controlling actuators, switches, and other elements of a device 150 that may be activated. The aforementioned elements are known to one of ordinary skill in the art.

The microcontroller 202A can be coupled to the transceiver 205A. The transceiver 205A can further include a radio-frequency (RF) signal generator. The microcontroller 202A can also be coupled to the remote field device 150 through input and output lines 211A. The input and output lines 211A can be connected to sensors or circuitry that monitor and/or control the operation of remote field device 150. The CPU 202A can also be coupled to a memory 207A as well as one or more environmental sensors 161. The environmental sensors 161 can provide data on external environmental conditions relative to the remote field device 150. For example, the sensors 161 can detect temperature, precipitation, ambient light, and other like parameters.

The memory 207A can be any type of hardware that can store digital information and that can be updated. The memory 207A can take the form as random access memory (RAM) such as SRAM or DRAM. However, other memory hardware such as EEPROM and ERPROM are not beyond the scope of the invention. The memory 207A may also store any software programs that are used to operate the packet transceiver module 200A.

The microcontroller 202A and other remaining elements of the packet transceiver module 200A may be powered by a source such as a battery 209A. The battery 209A may comprise any type and it can be rechargeable. Some battery types include, but are not limited to, Lead acid, lithium ion, lithium-ion polymer, nickel cadmium, nickel-metal hydride, and molten salt type batteries. However, other battery types not identified are not beyond the invention. Further, embedded logic and/or expert system analysis as part of system design that can sense end of useful battery life and automatically schedule refreshment and/or replacement scheduling controls are also not beyond the invention.

Alternatively, the packet transceiver module 209A may be powered by electricity. However, it is envisioned the packet transceiver module will be coupled to existing devices 150 much after they have been constructed as an after-market attachment. For example, the packet transceiver module 200A may be coupled to existing utility meters or gauges that may not be designed to have electrical power in close proximity to the meters or gauges. In these after-market attachment situations, direct electrical connections to power the packet transceiver module 200A may not be available or feasible. And therefore, powering the packet transceiver module 200A with a battery 209A may be the easiest and most efficient power source solution.

The packet transceiver module 200A may further comprise an antenna scanning controller 211A. The antenna scanning controller 211A may be coupled to a motor (not illustrated) that physically rotates antenna 153 for scanning so that the footprint or RF beam produced by the antenna 153 can be adjusted or shaped. Alternative, instead of mechanical scanning, the antenna 153 may further comprise multiple elements (not illustrated) that can be activated in a predefined manner, such as through phasing, by the antenna scanning controller 211A. This phasing of elements of the antenna 153 can provide electrical scanning in which the foot print or RF beam produced by the antenna 153 is steered and/or shaped. Further, the material composition of the housings for the packet transceiver module 200 may be designed to shape the radiation foot print produced by the antenna 153. Such material composition may also be important when a housing for a remote field device 150, gateway 103, or a node 155 is used to function as an antenna.

The packet transceiver module 200A can be mechanically configured on a single printed circuit board (PCB) and can be contained in any number of housings known to one of ordinary skill in the art. For example, as illustrated in FIG. 1, cylindrical housings used for the nodes 155 can be used for the packet transceiver module 200A.

Nodes 155 of FIG. 3

Referring now to FIG. 3, this figure is a functional block diagram illustrating some core architectural components of a packet transceiver module 200A that forms a node 155 of an elevated mesh network 160 according to one exemplary embodiment of the invention. The architecture of each node 155 is substantially similar to the architecture of the packet transceiver modules 200A that are coupled to the remote field devices 150 illustrated in FIG. 2. Therefore, only the differences between FIG. 2 and FIG. 3 will be described below.

The input and output lines 211B of the node 155 that form part of the elevated mesh network 160 may be connected to sensors such as transducers and switches that monitor and control operations of a street lamp 157. Similar to the packet transceiver module 200A illustrated in FIG. 2, the node 155 may also include a microcontroller 202B that has subcomponents such as the program controller 213, diagnostics processor 216, and control logic 219. However, the node 155 may have further elements to support operations of the elevated mesh network 160. Unlike and opposite to the packet transceiver modules 200A that are designed to operate independently and in a stand-alone fashion relative to other packet transceiver modules 200A that are couple to other devices, the packet transceiver modules 200B that form the nodes 155 are designed to operate in concert or in conjunction with other packet transceiver modules 200B Therefore, to support the operation and functionality of the elevated mesh network 160, the microcontroller 202B may further comprise a packet transfer controller 303. The packet transfer controller 303 can determine how to handle incoming and outgoing messages that are modulated on a radio-frequency (RF) carrier generated by the radio transceiver 205A. The packet transfer controller 303 can determine whether to repeat or retransmit a message; whether a message should be discarded; whether to pass the message through to the program controller; or whether to hold the message if a neighboring node 155 is unavailable. Each node 155 is designed to relay messages to neighboring nodes alone predetermined paths of the elevated mesh network 160.

The design and operation of the packet transfer controller 303 as well as the other components of a microcontroller 202B, such as the program controller 213B, diagnostics controller 216B, and control logic 219, of a node 155 in an elevated mesh network 160 are known to one of ordinary skill in the art. Each node 155 may operate similarly to the nodes 155 of the mesh network 160 described in U.S. Pat. No. 7,050,808, issued on May 23, 2006, based on Non-Provisional patent application Ser. No. 09/875,529, entitled, "Method and System for Transmitting, Receiving, and Collecting Information Related to a Plurality of Working Components," filed on Jun. 6, 2001. The entire contents of this patent are hereby incorporated by reference.

Figure 4:
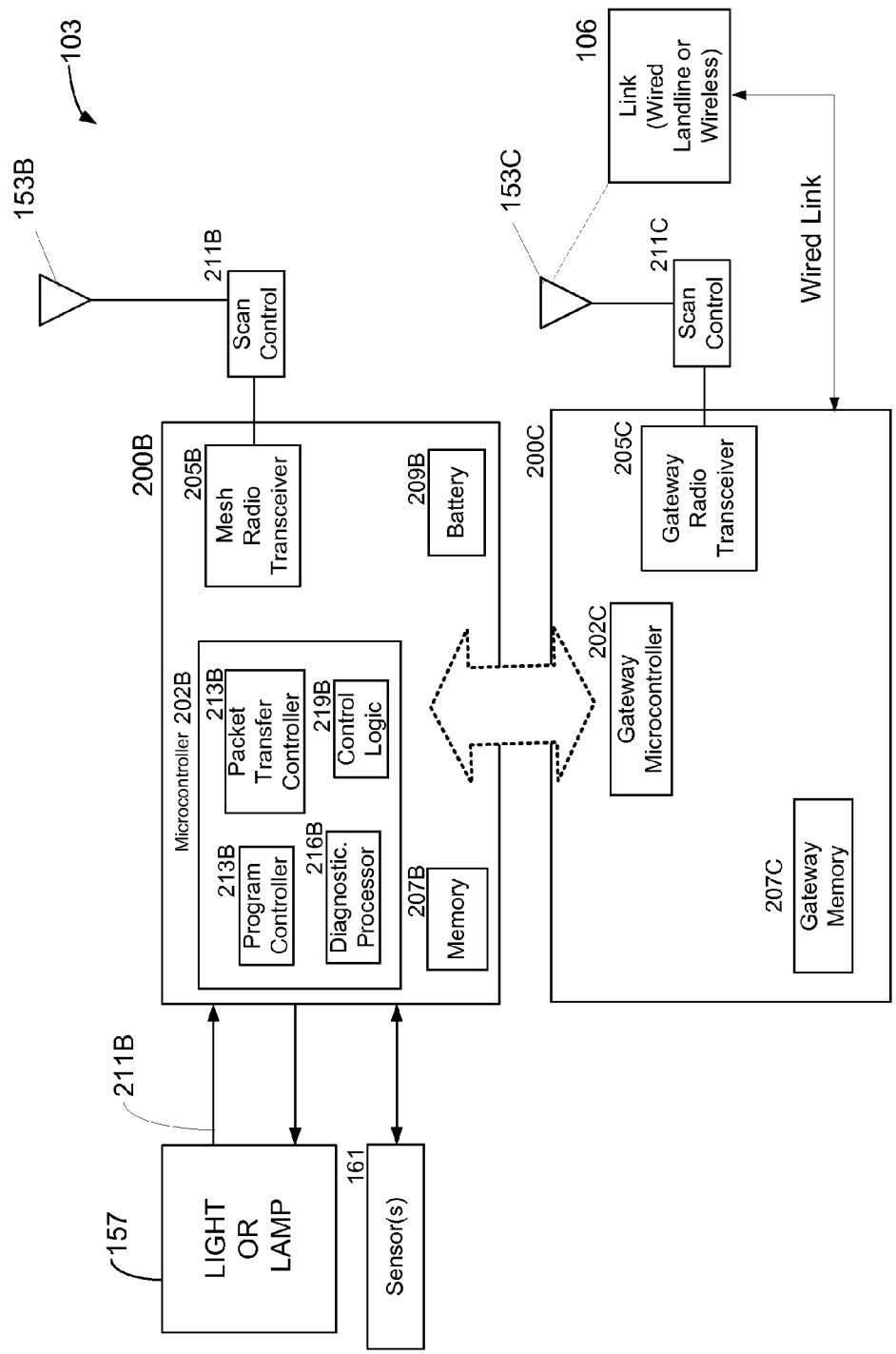
FIG. 4 is a functional block diagram illustrating some core architectural components of a communications gateway that can couple an elevated mesh network to an asynchronous middleware system according to one exemplary embodiment of the invention.

Communications Gateway 103 of FIG. 4

Referring now to FIG. 4, this Figure is a functional block diagram illustrating some core architectural components of a communications gateway 103 that can couple an elevated mesh network 160 to an asynchronous middleware system 112 according to one exemplary embodiment of the invention. The architecture of the communications gateway 103 is substantially similar to the architecture of the nodes 155 that are illustrated in FIG. 3. Therefore, only the differences between FIG. 3 and FIG. 4 will be described below.

Since the communications gateway 103 has all of the elements of a node 155, the device operates in a manner like any other node 155 of the elevated mesh network 160 if the communications gateway 103 is only functioning as a node 155. However, if the communications gateway 103 needs to forward information to or receive information from the asynchronous middleware communications system 112, then the additional components of the gateway 103 can be utilized.

The gateway 103 can comprise a second packet transceiver module 200C relative to its first packet transceiver module 200B that supports the communications of the elevated mesh network 160. However, the second packet transceiver module 200C is designed to establish the communications link 106 with the asynchronous middleware communications system 112. Like the first packet transceiver module 200B of gateway 103, the second packet transceiver module 200C can comprise a microcontroller 202C, a memory 207C, and radio transceiver 205C.

While the communications link 106 established on a periodic basis with the asynchronous middleware communications system 112 in a preferred exemplary embodiment is a wireless one, the communications link 106 can be a wired one if direct wiring of the communications gateway 103 is more feasible and readily available in a particular circumstance. As noted above, the communications link 106 can be established by the communications gateway 103 if any one of or a combination of conditions is met: the gateway 103 has received an authorized request or control signal (or both) from the asynchronous middleware communications system 112; after a predetermined time interval; and the gateway 103 receives at least one of special data or a delta change code from one or more remote field devices 150.

One of the key features of the communications gateway 103 is the ability of the second packet transceiver module's microcontroller 202C to compress and store data received from the remote field devices 150. Any one or combination of data compression techniques known to one of ordinary skill in the art can be employed. The second memory 207C of the second packet transceiver module 200C may also comprise more than RAM, EEPROMs, and/or EPROMs. The second memory 207 can also comprise any one of magnetic (such as hard disk or tape drives), magnetic-optical, optical (WROM), or other known memory storage devices.

By compressing the data received from the remote field devices 150, the communications gateway 103 may send data to the asynchronous middleware communications system 112 with short RF transmission bursts according to one exemplary wireless embodiment. As noted above, through establishing the communications link 106 to the asynchronous middleware communications system 122 only periodically and for short durations using RF bursts, the communications gateway 103 can conserve resources and especially reduce costs when a cellular telephone network is used as part of the communications link 106 to the middleware communications system 112.

While the exemplary embodiment illustrated in FIG. 4 has two antennas 153B and 153C, one of ordinary skill in the art recognizes that one antenna 153 could be used if the first and second radio transceivers 205B and 205C share use of a single antenna 153. Similarly, one of ordinary skill in the art recognizes that the first and second microcontrollers 202B, 202C could also share use of a single radio transceiver 205. However, in the single transceiver 205 exemplary embodiment (not illustrated), the single transceiver would need to support two completely separate frequency bands such as the frequency band for the mesh network 160 and to create the communications link 106, which in some instances can be created using a cellular telephone service.

Figure 5:
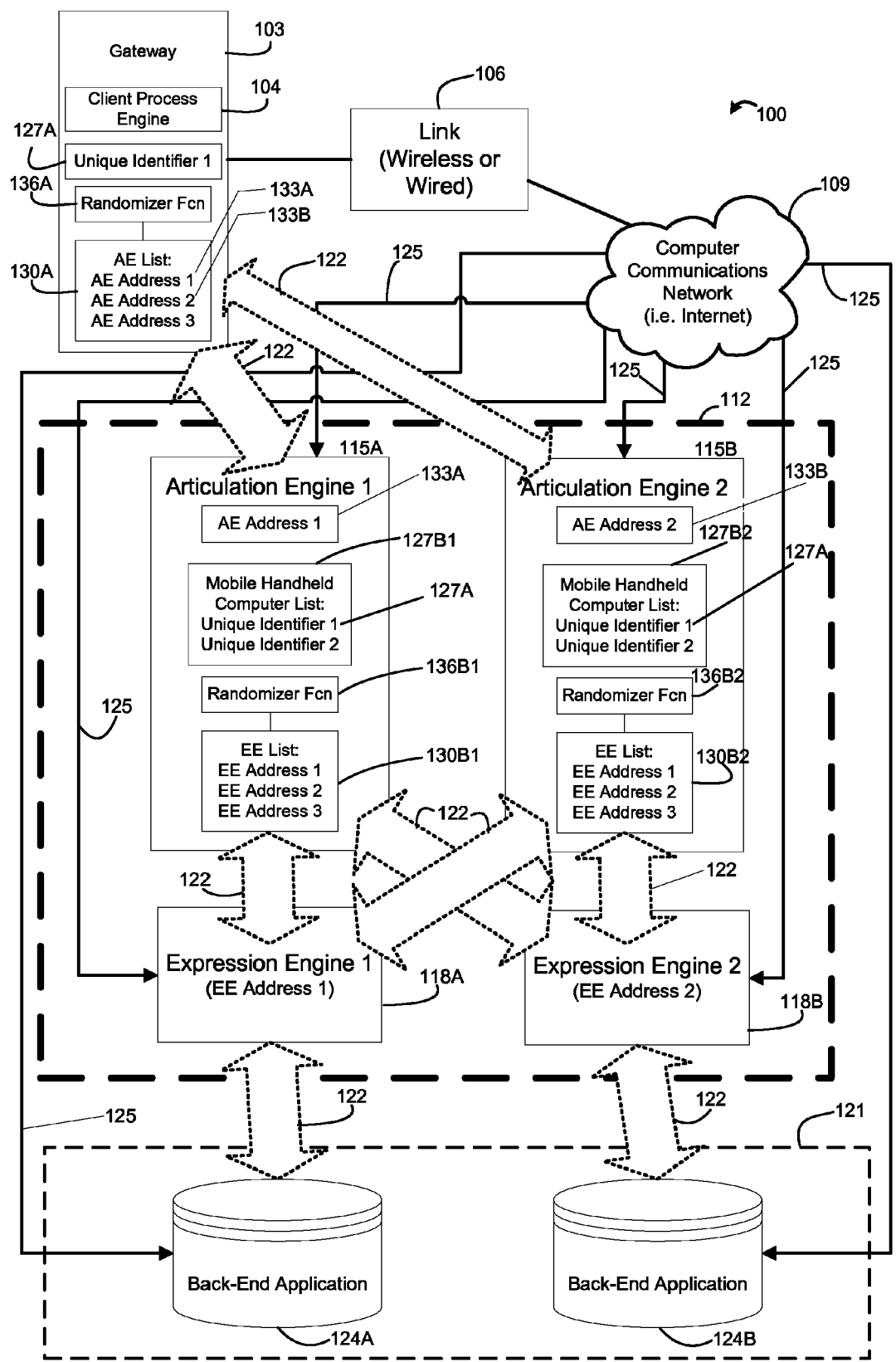
FIG. 5 is a functional block diagram of some core architectural components for an asynchronous middleware system that communicates data between an elevated mesh network, and particularly a communications gateway, and a back-end computer system according to one exemplary embodiment of the invention.

Asynchronous Middleware Communications System of FIG. 5

Referring now to FIG. 5, this figure is a functional block diagram of some core architectural components for a subsystem 100 comprising the asynchronous middleware system 112 that communicates data between an elevated mesh network 160, and particularly a communications gateway 103, and a back-end computer system 121 according to one exemplary embodiment of the invention. According to one preferred and exemplary embodiment, the asynchronous middleware communications system 112 can comprise the enfoTrust™ Telemetric Monitoring (ETM) that includes the RedRover™ data transport architecture, described in commonly assigned and co-pending U.S. Non-Provisional patent application Ser. No. 11/317,646, entitled, "System and Method for Communicating Data Between Wireless Gateway and a Back-End Computer System," filed on Dec. 23, 2005. The entire contents of the Ser. No. 11/317,646 patent application are hereby incorporated by reference.

FIG. 5 also provides an illustration and description of additional functionality of the communications gateway 103 that is usually embodied in software executed by the second microcontroller 202C of the gateway 103. The exemplary computer architecture of middleware system 112 can comprise a listener tier coupled to a computer network 109 and a back-end computer system 121. One of ordinary skill in the art recognizes that the elevated mesh network 160 as well as the asynchronous middleware system 112 may operate in a networked environment using logical connections to one or more other remote computers.

The remote computers may be another personal computer, a server, a client such as web browser, a router, a network PC, a peer device, or a common network node. The logical connections depicted in both FIG. 1 and FIG. 5 can include additional local area networks (LANs) and a wide area networks (WANs) not shown. Such networking environments are commonplace in offices, large industrial facilities, enterprise wide computer networks, intranets, and the Internet.

The computers illustrated in FIG. 1 and FIG. 5 may be coupled to a LAN through a network interface or adaptor. When used in a WAN network environment, the computers may typically include a modem or other means for establishing direct communication lines over the WAN.

In a networked environment, program modules may be stored in remote memory storage devices. It will be appreciated that the network connections shown are exemplary and other means of establishing a communications link between computers other than depicted may be used.

Moreover, those skilled in the art will appreciate that the present invention may be implemented in other computer system configurations, including other packet transceiver modules 200, multiprocessor systems, microprocessor based or programmable consumer electronics, networked personal computers, minicomputers, mainframe computers, and the like.

The invention may be practiced in a distributed computing environment, as illustrated in both FIG. 1 and FIG. 5, where tasks may be performed by remote processing devices that are linked through a communications network such as the distributed computer network 109. The distributed computer network may comprise the Internet or a wide area network (WAN). In a distributed computing environment, program modules may be located in both local and remote storage devices. The invention may be practiced in a distributed, intelligent, and adaptive net-centric operational (NCO) environment, where tasks may be performed by remote and/or expert processing devices.

The gateway 103 can comprise any general purpose computer capable of running software applications. The communications gateway 103 of the elevated mesh network 160 can communicate with the computer network 109 through the communications link 106. The gateway can comprise client process engine software 104 running on the gateway 103.

As noted above, the communications link 106 between the gateway 103 and asynchronous communications system 112 can be wire or wireless, depending upon the location of the gateway 103 and its proximity to a wired connection. In a preferred, yet exemplary embodiment, the link 106 can comprise a wireless link. As noted above, typical wireless links 106 include a radio frequency type in which the gateway 103 can communicate with the asynchronous middleware system 112 using radio frequency (RF) electromagnetic waves. Other wireless links 106 that are not beyond the scope of the invention can include, but are not limited to, magnetic, optical, acoustic, and other similar wireless types of links 106.

The communications link 106 allows the gateway 103 to communicate with the computer network 109 that may comprise the Internet. As noted above, according to one exemplary aspect, the client process engine 104 of the gateway 103 can be programmed to initiate the communications link 106 at predetermined times during the day or at set predetermined time intervals. The client process engine 104 can also initiate the communications link 106 if it determines that it has data that the back-end computer system 121 should have prior to a scheduled communications link 106. Similarly, the back-end computer system 121 can initiate the communications link 106 if it determines that it has data that the back-end computer system 121 should have prior to a scheduled communications link 106.

By only initiating a communications link 106 only when data is ready to be transmitted, the inventive system 101 (of FIG. 1) can take advantage of processing information during any "down" time or time in which the gateway 103 is "offline" or not linked to the back-end computer system 121. And further and as noted above, scheduling only periodic links 106 can also conserve costs that are associated with wireless networks and "air-time."

The computer network 109 can comprise any type of computer network such as a local area network (LAN), wide area network (WAN), or the Internet. The computer network 109 can be coupled to the listener tier of the exemplary asynchronous middleware communications system 112. The listener tier can comprise first and second articulation engines 115A, 115B and the first and second expression engines 118A, 118B. The listener tier can be designed to transmit data to and receive data from the gateway 103 across the computer network 109. The listener tier can comprise one or more articulation engines 115 and expression engines 118.

Each articulation engine 115 is designed to communicate data between the gateway 103 and a respective expression engine 118. The expression engine 118 that is coupled to one or more articulation engines 115 communicates data between a respective articulation engine 115 and the back-end computer system 121.

Each articulation engine 115 can comprise a computer server that executes various software applications for communicating with the gateway 103 and the expression engine 118. The expression engine 118 can comprise a computer server such as a sequential query language (SQL) server that maintains upload and download files for each respective gateway 103 that may be assigned to a particular expression engine 118. The expression engine 118 is designed to communicate between the articulation engine 115 and the back-end computer system 121.

While the gateway 103 and articulation engines 115 are illustrated as communicating with one another through dashed arrows 122, these arrows 122 denote virtual connections between the articulation engines 115 and the gateway 103 and not direct physical connections. Similarly, the articulation engine 115 and expression engine 118 are also illustrated as communicating with one another through dashed arrows 122 where the arrows 122 denote virtual connections between the articulation engines 115 and expression engines 118 and not direct physical connections.

Each expression engine 118 is connected to one or more articulation engines 115 through the computer network 109 as indicated by solid, direct-link, lines 125. Further, while each listener tier comprises a group of articulation engines 115 and expression engines 118 contained within a rectangular box, one of ordinary skill in the art recognizes that this grouping of elements is a logical association rather than an actual physical one. For example, the first articulation engine 115A could physically exist in a first geographic location, such as the State of Georgia, while the second articulation engine 115B could exist in a second geographic location, such as the State of Maryland. The physical locations of the expression engines 118 can also be different from one another as well as different from the articulation engines 115.

The expression engines 118 connect the articulation engines 115 to back-end computer systems 121. The back-end computer systems 121 can further comprise various application-specific software that may run on larger computers such as servers 124. For example, a back-end server 124 can execute application software that is specific to an industry such as utilities like oil, gas, water and electricity, and municipalities, and the like. In a utility application, as noted above, the back-end computer system 121 can monitor and control utility meters 150B and utility controllers 150C. In a municipality application, the back-end computer system 121 can monitor and control parking meters 150A and traffic control devices 150D. For example, the back-end computer system 121 can raise or lower parking meter rates depending on consumer demand as well as adjusting timing and frequency of traffic lights, traffic gates, and other like equipment.

With the asynchronous middleware communications system 112, a balanced communication load and relative ease in maintaining the entire system 101 can be achieved. Specifically, according to one exemplary aspect, each gateway 103 has a unique identifier 127A that is assigned to a particular group of articulation engines 115. Prior to establishing a link 106 with the computer communications network 109, the gateway 103 through the client process engine 104 can select one of several computer addresses from a list 130A of computer network addresses. The list 130A of computer addresses can comprise computer addresses of the articulation engines 115 that are assigned to a particular gateway 103.

The computer addresses can comprise addresses such as Internet Protocol (IP) addresses. For example, the client process engine 104 could select the first computer network address 133A that is the computer network address for the first articulation engine 115A as illustrated in FIG. 1. Similarly, the client process engine 104 could also select the second computer network address 133B that corresponds to the computer network address for the second articulation engine 115B. The invention could include any number of computer network addresses that are contained in the list 130A.

To assist with balancing the communication between respective articulation engines 115 such as the first articulation engine 115A and the second articulation engine 115B, the client process engine 104 of the hand-held computer 103 can use a randomizer function 136 that allows the gateway 103 to select its first articulation engine 115 prior to establishing a link 106 with the computer communications network 109.

According to one exemplary embodiment, the client process engine 104 can use the randomizer function 136A in order to select a first computer network address out of the list 130A of computer network addresses available to a particular gateway 103. This means that if a particular computer network address is first selected by a gateway 103 and it fails, the client process engine 104 can then select the next computer network address from the list 130A in sequence instead of using the randomizer function 136A.

However, it is not beyond the scope of the invention for the client process engine 104 to use the randomizer function 136A for selecting each computer network address from the list 130A of network addresses. Selecting a first computer network address randomly and then selecting a next computer address in sequence from the list 130A can help balance the communication load between respective articulation engines 115 of a particular listener tier 112 that may be assigned to a group of gateways 103.

Allowing each gateway 103 to select a respective articulation engine 115 from the list 130A of computer network addresses also increases the stability of the middleware communications system 112. For example, if a particular articulation engine 115 requires servicing, then that particular articulation engine 115 can be taken offline without service disruption for a particular gateway 103. In other words, if a gateway 103 selects a first computer network address 133A that may be assigned to a first articulation engine 115A and if the first articulation engine 115A is offline, then the gateway 103 can select the next computer network address from the list 130A of the computer network addresses. In this way, the next articulation engine 115 that is selected could be the second articulation engine 115B.

Similar to the computer network addresses 130A maintained within the gateway 103, each articulation engine 115A may also maintain a list 130B of computer network addresses for respective expression engines 118 that are assigned to a particular articulation engine 115. Like the gateway 103, the articulation engine 115A can also use a randomizer function 136B to randomly select its first computer network address from the list 130B of computer network addresses for its respective expression engines 118.

In this way, communication load balancing can be achieved between numerous expression engines 118 that may service one or more articulation engines 115. And as noted above, it is not beyond the scope of the invention to utilize the randomizer function 136B for each selection that is made from the list 130B of computer network addresses. And similar to what is described above, if service or maintenance is required for a particular expression engine 118, a particular unit may be taken offline without affecting communications because of the articulation engine's 115 ability to select another expression engine 118 from the list 130B of computer network addresses maintained by a respective articulation engine 115.

In summary, the first and second lists 130A, 130B that are maintained in respective gateways 103 and respective articulation engines 115 in the listener tier increase performance of the middleware system 100 by providing automatic fail-over in addition to communication load balancing. The ease at which a gateway 103 can identify an available articulation engine 115 as well as the ability of the articulation engine 115 being able to find an available expression engine offers a very scalable and durable middleware communications system 112.

The middleware system 112, as illustrated in FIG. 5, also provides simple communications between a respective articulation engine 115 and a gateway 103. Specifically, the articulation engine 115 does not typically perform any significant or rigorous authentication of respective gateways 103 that may be serviced by a particular articulation engine 115. Instead of checking through several layers of security to determine if a particular gateway 103 is permitted to access the back-end computer system 121, according to one exemplary embodiment, the articulation engine 115 can usually authenticate a wireless gateway 103 by comparing the hand-held computer identifier 127A that is sent by the gateway 103 with the stored unique identifier 127B that is maintained in the articulation engine 115.

If the two unique identifiers 127A and 127B match, then the articulation engine 115 has authenticated the wireless gateway 103 and, therefore, the articulation engine 115 can proceed with communicating with the respective gateway 103. However, one of ordinary skill in the art recognizes that one or more additional layers of security could be implemented by the articulation engine 115 without significantly affecting the simple communications that are established between the gateway 103 and a respective articulation engine 115. For example, information security that contains defense in depth and is geared to best design practices, such as role based access controls (RBAC), to strengthen confidentiality, availability and integrity, in accordance with existing standards such as ISO 17799 as well as future standards not yet developed, can be implemented without significantly affecting performance of the entire system 101.

Further details of the asynchronous middleware communications system 112 are described in commonly assigned and co-pending U.S. Non-Provisional patent application Ser. No. 11/317,646, entitled, "System and Method for Communicating Data Between Wireless Gateway and a Back-End Computer System," filed on Dec. 23, 2005. The entire contents of this non-provisional patent application are hereby incorporated by reference.

Figure 6:
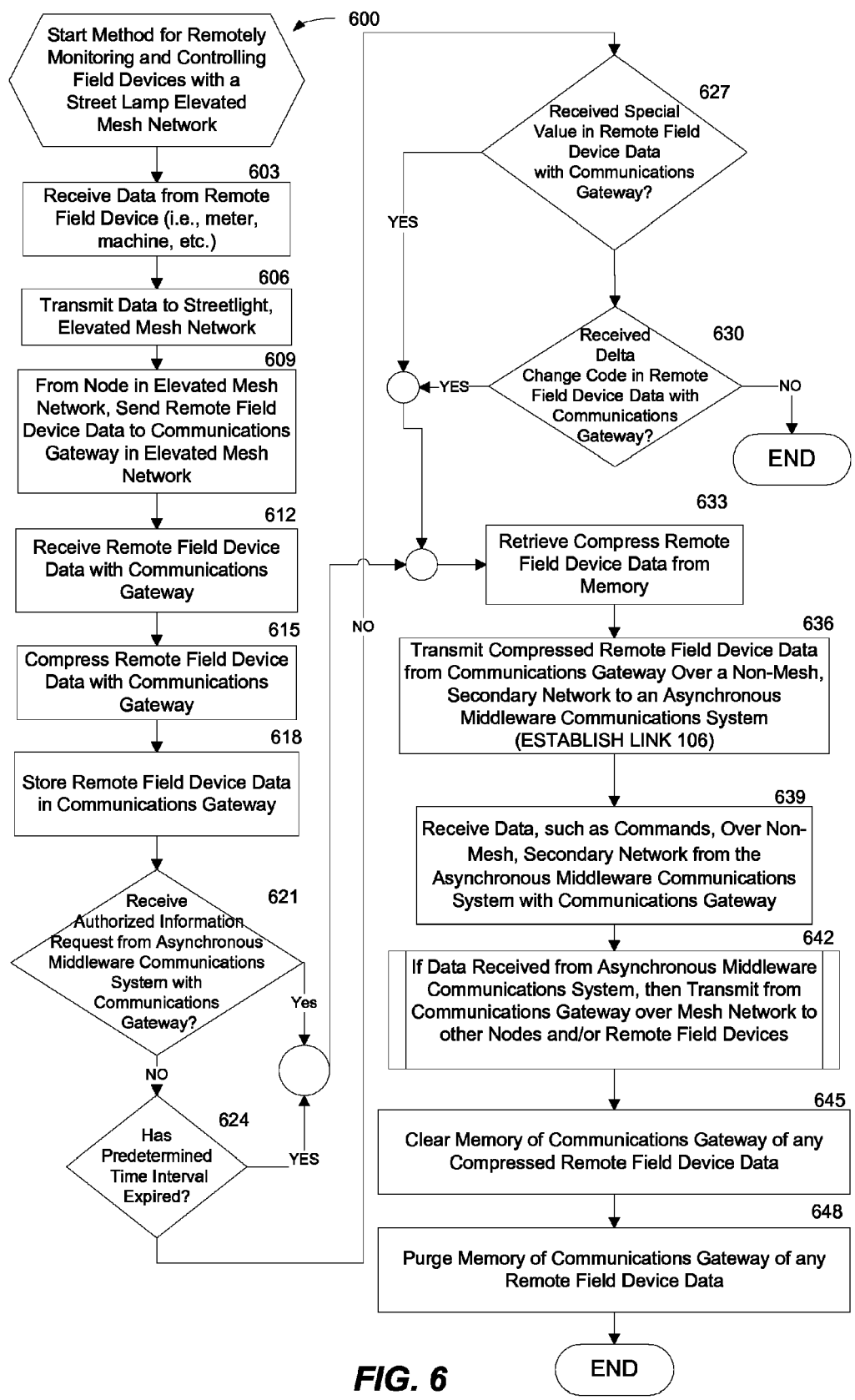
FIG. 6 is a logic flow diagram illustrating an exemplary method for remotely monitoring and controlling field devices with an elevated mesh network according to one exemplary embodiment of the invention.

Method for Remotely Monitoring and Controlling Field Devices with an Elevated Mesh Network—FIG. 6.

Referring now to FIG. 6, this figure is a logic flow diagram illustrating an exemplary method 600 for remotely monitoring and controlling field devices 150 with an elevated mesh network 160 according to one exemplary embodiment of the invention. The processes and operations of the remote monitoring and control system 101 described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

Referring again to FIG. 6, step 603 is the first step in the exemplary process 600 in which the packet transceiver module 200A of a remote field device 150 can receive data from sensors coupled to the device 150 or from environmental sensors 161. For example, a packet transceiver module 200A coupled to a utility meter 150B may receive data on how much of a utility product has been consumed as well as external environmental data such as the temperature measured by an environmental sensor 161.

Next, in step 606, the packet transceiver module 200A can transmit the data to the elevated mesh network 160. In particular, the radio transceiver module 205A can modulate the received data onto a radio-frequency (RF) carrier that can be received by a node 155 or the gateway 103 of the elevated mesh network 160.

In step 609, the remote field device data can be sent from a node 155 to the communications gateway 103 in the elevated mesh network 160. In this step, the remote field device data can be relayed between several nodes 155 until the information reaches the communications gateway 103. In some instances, if the packet transceiver module 200A is in close proximity to the communications gateway, the remote field device data may be received directly by the communications gateway 103 so that this step may not be needed or used.

In step 612, the remote field device data is received by the communications gateway 103. In particular, after the RF carrier containing the remote field device data is demodulated by the radio transceiver 205B, the first microcontroller 202B of the gateway 103 can determine if the received data relates to lights 157 or if it relates to remote field devices. If the data relates to remote field devices 150, then the first microcontroller 202B can send the remote field data to the second microcontroller 202C of the second packet transceiver module 200C.

In step 615, the second microcontroller 202C of the gateway 103 can compress the remote field device data using one or more compression algorithms known to one of ordinary skill in the art. Next, in step 618, the second microcontroller 202C can store the compressed, remote field device data in the second memory 207C. The second memory 207C can be volatile or non-volatile memory and may comprise RAM in the form of DRAM or SRAM. Other memory types, such as magnetic, magnetic-optical, and optical are not beyond the scope of the invention.

Next, in decision step 621, the second microcontroller 202C of the gateway 103 can determine if it has received an authorized information request from the asynchronous middleware communications system 112. If the inquiry to decision step 621 is positive, then the "Yes" branch is followed to step 633. If the inquiry to decision step 621 is negative, then the "No" branch is followed to decision step 624.

In decision step 624, the second microcontroller 202C of the gateway 103 can determine if a pre-set or predetermined time interval has expired. This time interval can be set by the microcontroller 202C itself or the interval can be set by the back-end computer system 121. If the inquiry to decision step 622 is positive, then the "Yes" branch is followed to step 633. If the inquiry to decision step 624 is negative, then the "No" branch is followed to decision step 627.

In decision step 627, the second microcontroller 202C of the gateway 103 can determine if the any of the received remote field device data contains a special value. For example, if the remote field device data contains a value or flag that indicates a remote field device 150 is in need of repair, then such data can constitute a special value. As another non-limiting example, if the remote field device data has a magnitude that is above a pre-selected threshold, such as a maximum consumption rate or operation state of the remote field device 150, then such a value in the remote field device data can constitute a special value. One of ordinary skill in the art will recognize that special values can be set by the back-end computer system 121 depending on the type of remote field device 150 being monitored and controlled. If the inquiry to decision step 627 is positive, then the "Yes" branch is followed to step 633. If the inquiry to decision step 627 is negative, then the "No" branch is followed to decision step 630.

In decision step 630, the second microcontroller 202C of the gateway 103 can determine if the received remote field device data contains a delta change code. A delta change code can comprise a change in operating status such as "On" or "Off" condition of a remote field device 150. Alternatively or in addition, a delta change code can comprise a change in an operating condition such as a change in state from "Normal" to "Failure", and vice-versa. The delta change code can comprise a change in an operating value, such as a change in a measured value, like a jump from a measure of 100 watts to 1000 watts of power. Other types of delta change codes are not beyond the invention. If the inquiry to decision step 630 is positive, then the "Yes" branch is followed to step 633. If the inquiry to decision step 630 is negative, then the "No" branch is followed and the process then ends.

In step 633, the second microcontroller 202C can retrieve the compressed remote field device data from memory 207C. Next, in step 636, the second microcontroller 202C can send the retrieved compressed remote field device data to the radio transceiver 205C. It is in this step that the communications link 106 can be established with the asynchronous middleware communications system 112. As noted above, this link 106 can be wired or wireless depending upon the environment of the gateway 103. For the wireless context, the radio transceiver module 205C can modulate the received remote field device data onto a radio-frequency (RF) carrier that can be received and processed by the computer network 109, as illustrated in FIG. 5.

In step 639, the second radio transceiver module 205C of the gateway 103 can receive any data from the asynchronous middleware communications system 112 while the communications link 106 is established. As noted above, if a wired link 106 is established instead of a wireless one, then the second microcontroller 202C of the gateway 103 may directly receive the information from the asynchronous middleware communication system 112 instead. Such data can include, but is not limited to, commands for remote field devices 150, new programs for controllers 202 of packet transceiver modules 200 coupled to the remote field devices 150 as well as packet transceiver modules 200 forming the nodes 155, new programs for the gateway 103, and other like information.

Figure 7:
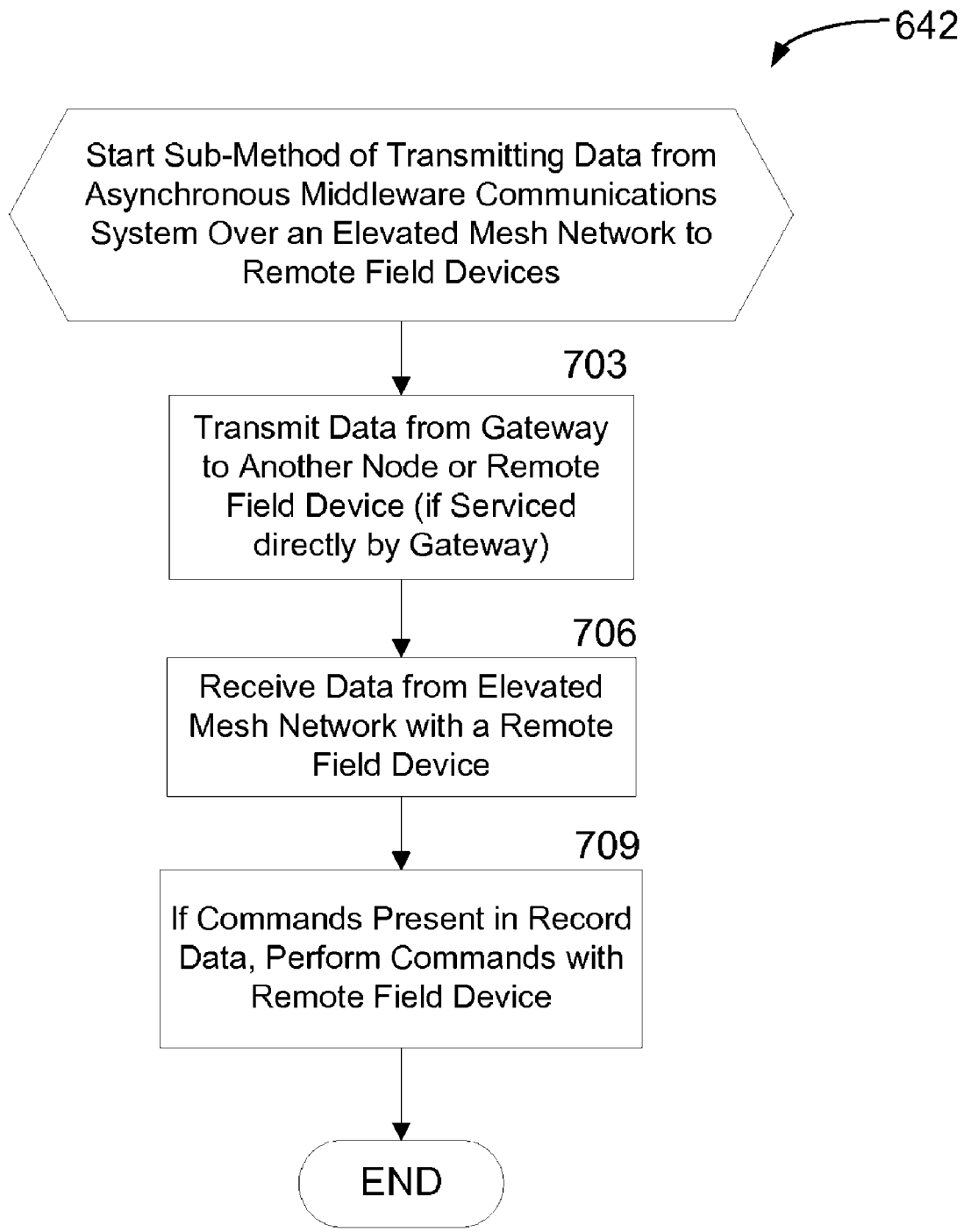
FIG. 7 is a logic flow diagram illustrating an exemplary sub-method for transmitting data from an asynchronous middleware communications system over an elevated mesh network and to a remote field device according to one exemplary embodiment of the invention.

Next, in routine 642, if data is received from the asynchronous middleware communications system 112 by the gateway 103, then the second controller 202C of the gateway 103 can transfer the received data to the first controller 202B of the first packet transceiver module 200B so that it can be relayed to other nodes 155 in the elevated mesh network 160. Further details of this routine 642 are described below with reference to FIG. 7.

In step 645, the second controller 202C of the gateway 103 can clear its memory 207C of the compressed remote field data. Specifically, in step 645, the second controller 202C can clear a copy the compressed remote field data that it has in its memory. Next in step 648, the second controller 202C can then purge its memory of any remote field data. In this step, the action of "purging" can clear any data structures that may be used to maintain the compressed remote field data. The process then ends.

Sub-method 642 for Transmitting Data from Asynchronous Middleware Communications System 112 over an Elevated Mesh Network 160 to Remote Field Devices 150

Sub-method or routine 642 corresponds to the same routine illustrated in FIG. 6. Step 703 is the first step of the sub-method in which the first microcontroller 202B of the gateway can determine the destination of the received data from the asynchronous middleware system 112. Once the first microcontroller 202B determines the destination for the data, the first radio transceiver module 205B of the gateway 103 can modulate the received data onto a radio-frequency (RF) carrier that is supported by the mesh network 160 to a node 155. Alternatively, if the gateway 103 services the remote field device 150 that is intended to receive the data, the first radio transceiver module 205B can transmit the data directly to the intended remote field device 150.

Next, in step 706, the remote field device 150 can receive the data from a packet transceiver module 200B of a node 155 or the gateway 103. Specifically, the packet transceiver module 200A through its radio transceiver module 205A can receive the data from a node 155 or gateway 103. Subsequently, in step 709, if the data has commands for the remote field device 150, the control logic 219 can execute the commands and send appropriate signals to the remote field device 150. The process then ends.

Conclusion

A method and system for remotely monitoring and controlling field devices that includes an elevated mesh network and that comprises a plurality of packet transceiver modules that are supported and coupled to street lamps has been described. Each packet transceiver module of a node in the elevated mesh network may be coupled to a remote field device through a wireless link, such as through a radio frequency (RF) channel supported by the elevated mesh network. Each remote field device can receive commands from as well send operation data to the elevated mesh network through the wireless link.

A remote field device can be any one of several types or classes of devices. Remote field devices can include, but are not limited to, utility meters such as gas, electric, water, oil, and other like meters and other like meters as well as any type of building monitor or gauge such as a security system; a parking meter; a traffic control device such as a stop light, moveable gate, drawbridge, and other like traffic control devices; pumps, generators, and other like machinery.

The elevated mesh network can link the remote field devices to an asynchronous middleware communications system by using a communications gateway that is part of the elevated mesh network. The communications gateway can be coupled to the asynchronous middleware communications system through either a wired or wireless link. The communications gateway is a store and forward system that connects with the asynchronous middleware communications system on periodic basis.

The asynchronous middleware communications system can be coupled to a back-end application or computer system. The back-end application or computer system can diagnose and control the remote field devices as well as archive the data received from the remote field devices.

It should be understood that the foregoing relates only to illustrate the embodiments of the invention, and that numerous changes may be made therein without departing from the scope and spirit of the invention as defined by the following claims.

What is claimed is:

1. A computer-implemented method for communicating data between a remote field device and a back-end computer system comprising:
receiving data from a remote field device of a plurality of remote field devices, the data indicating a traffic condition being monitored by the remote field device;
transmitting the data from the remote field device to an elevated mesh network;
relaying the data across the elevated mesh network to a communications gateway;
determining if the data should be communicated to the back-end computer system;
establishing a link between the communications gateway and the back-end computer system for a predetermined amount of time; and
transferring the data from the communications gateway to the back-end computer system while the link is active, wherein the back-end computer system or the communications gateway adjusts a rate of operation of one or more traffic devices associated with at least one of the plurality of remote field devices responsive at least in part to the traffic condition indicated by the data.

2. The computer-implemented method of claim 1, further comprising supporting the elevated mesh network with one or more utility poles.

3. The computer-implemented method of claim 1, wherein determining if the data should be communicated to the back-end computer system further comprises determining if a request for information has been received by the communications gateway.

4. The computer-implemented method of claim 1, wherein determining if the data should be communicated to the back-end computer system further comprises determining if a predetermined amount of time has passed.

5. The computer-implemented method of claim 1, wherein determining if the data should be communicated to the back-end computer system further comprises determining if the data received from the remote field device comprises a special value or delta change code.

6. A system for communicating data between a remote field device and a back-end computer system comprising:
a remote field device comprising a packet transceiver module, wherein the remote field device is one of a plurality of remote field devices;
an elevated mesh network comprising a plurality of nodes, each node comprising a packet transceiver module, at least one node in communication with the remote field device; and a communications gateway forming a part of the elevated mesh network and receiving data originating from the remote field device from one of a node in the mesh network and the remote field device, the communications gateway determining if the data should be communicated to a back-end computer system and selectively establishing a link with the back-end computer system on a periodic basis, the data indicating a traffic condition being monitored by the remote field device, wherein the back-end computer system or the communications gateway adjusts a rate of operation of one or more traffic devices associated with at least one of the plurality of remote field devices responsive at least in part to the traffic condition indicated by the data.

7. The system of claim 6, wherein the elevated mesh network is supported by one or more utility poles.

8. The system of claim 6, wherein the communications gateway stores the data in memory for a period of time while the link with the back-end computer system is inactive.

9. The system of claim 6, wherein the communications gateway operates as a node and relays information to other nodes in the elevated mesh network.

10. A computer-implemented method for communicating data between a remote field device and a back-end computer system comprising:
transmitting the data from a non-light remote field device of a plurality of non-light remote field devices to an elevated mesh network supported by utility poles, the data indicating a traffic condition being monitored by the remote field device;
receiving the data with a communications gateway that is part of the elevated mesh network and that is supported by a utility pole;
determining if the data should be communicated to the back-end computer system; and
establishing a link between the communications gateway and the back-end computer system for a predetermined amount of time, wherein the back-end computer system or the communications gateway adjusts a rate of operation of one or more traffic devices associated with at least one of the plurality of non-light remote field devices responsive to the traffic condition indicated by the data.

11. The computer-implemented method of claim 10, further comprising relaying the data across the elevated mesh network to a communications gateway.

12. The computer-implemented method of claim 10, further comprising transferring the data from the communications gateway to the back-end computer system while the link is active.

13. The computer-implemented method of claim 10, further comprising attaching a node of the mesh network to a street lamp.

14. The computer-implemented method of claim 10, further comprising compressing the data with the communications gateway.

15. The computer-implemented method of claim 1, wherein the one or more traffic devices includes a traffic light or traffic gate.

16. The computer-implemented method of claim 1, wherein the rate of operation of the one or more traffic devices is adjusted by adjusting a respective frequency of the one or more traffic devices.

17. The system of claim 6, wherein the one or more traffic devices includes a traffic light or traffic gate.

18. The system of claim 6, wherein the rate of operation of the one or more traffic devices is adjusted by adjusting a respective frequency of the one or more traffic devices.

19. The computer-implemented method of claim 10, wherein the one or more traffic devices includes a traffic light or traffic gate.

20. The computer-implemented method of claim 10, wherein the rate of operation of the one or more traffic devices is adjusted by adjusting a respective frequency of the one or more traffic devices.

* * * * *